(12) United States Patent
Kolesar

(10) Patent No.: US 9,020,309 B2
(45) Date of Patent: Apr. 28, 2015

(54) OPTICAL FIBER ARRAY CONNECTIVITY SYSTEM FOR MULTIPLE TRANSCEIVERS AND/OR MULTIPLE TRUNK CABLES

(71) Applicant: CommScope, Inc. of North Carolina, Hickory, NC (US)

(72) Inventor: Paul Francis Kolesar, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 13/942,212

(22) Filed: Jul. 15, 2013

(65) Prior Publication Data

US 2013/0343700 A1 Dec. 26, 2013

Related U.S. Application Data

(63) Continuation of application No. 12/608,230, filed on Oct. 29, 2009, now Pat. No. 8,485,737.

(51) Int. Cl.
*G02B 6/28* (2006.01)
*G02B 6/44* (2006.01)
*G02B 6/36* (2006.01)

(52) U.S. Cl.
CPC .............. *G02B 6/28* (2013.01); *G02B 6/3608* (2013.01); *G02B 6/4472* (2013.01)

(58) Field of Classification Search
CPC ....... G02B 6/28; G02B 6/4472; G02B 6/3608
USPC ........... 385/24, 76, 80, 81, 83, 115, 120, 114, 385/58, 121, 140, 142, 17
See application file for complete search history.

(56) References Cited

U.S. PATENT DOCUMENTS 6,549,710 B2    4/2003   Simmons et al. ............. 385/121
6,832,032 B2   12/2004   Simmons et al. ............. 385/121

(Continued)

FOREIGN PATENT DOCUMENTS

EP        1 462 835 A2    9/2004
WO    WO 99/13367      3/1999

(Continued)

OTHER PUBLICATIONS

Written Opinion of the International Preliminary Examining Authority for PCT/US2010/048873 dated Oct. 14, 2011.

(Continued)

*Primary Examiner* — Ellen Kim
(74) *Attorney, Agent, or Firm* — Myers Bigel Sibley & Sajovec, P.A.

(57) ABSTRACT

A transition device for an optical fiber connection system adapted to interconnect a trunk cable with a plurality of transceivers includes: a first set of at least four optical fibers, each of the optical fibers having a trunk end and a transceiver end; a single trunk end terminal having a plurality of trunk ports arranged in a first row, each port connected with a respective one of the set of optical fibers at its trunk end, wherein a first axis of symmetry divides the ports; and a plurality of transceiver end terminals, each of the transceiver end terminals having at least one couplet of transceiver ports, each of the couplets of transceiver ports receiving a respective couplet of the set of optical fibers at their transceiver ends.

20 Claims, 19 Drawing Sheets

(56) References Cited

U.S. PATENT DOCUMENTS

| | | | |
|---|---|---|---|
| 6,885,800 B2 | 4/2005 | Sun et al. | 385/114 |
| 6,996,359 B2 | 2/2006 | Awaya | |
| 7,689,079 B2 | 3/2010 | Burnham et al. | 385/51 |
| 8,251,591 B2 | 8/2012 | Barnes et al. | 385/59 |
| 8,406,587 B2 * | 3/2013 | Mudd et al. | 385/31 |
| 2005/0053337 A1 * | 3/2005 | Mayer | 385/89 |
| 2005/0271338 A1 | 12/2005 | Livingston | 385/114 |
| 2006/0133736 A1 | 6/2006 | Sullivan | 385/59 |
| 2006/0177175 A1 | 8/2006 | Mayer et al. | 385/24 |
| 2006/0275007 A1 | 12/2006 | Livingston et al. | |
| 2008/0267620 A1 | 10/2008 | Cole et al. | 398/17 |
| 2009/0180737 A1 * | 7/2009 | Burnham et al. | 385/59 |
| 2010/0098428 A1 | 4/2010 | Barnes et al. | 398/140 |
| 2010/0322562 A1 * | 12/2010 | Barnes et al. | 385/59 |
| 2011/0176779 A1 * | 7/2011 | Kolesar | 385/77 |
| 2011/0274400 A1 * | 11/2011 | Mudd et al. | 385/134 |

FOREIGN PATENT DOCUMENTS

| | | |
|---|---|---|
| WO | WO 02/44782 A2 | 6/2002 |
| WO | WO 2010/147762 A1 | 12/2010 |

OTHER PUBLICATIONS

International Search Report and Written Opinion for PCT/US2010/048873 mailed Dec. 20, 2010.

The International Preliminary Report on Patentability for PCT/US2010/048873 dated Jan. 20, 2012.

* cited by examiner

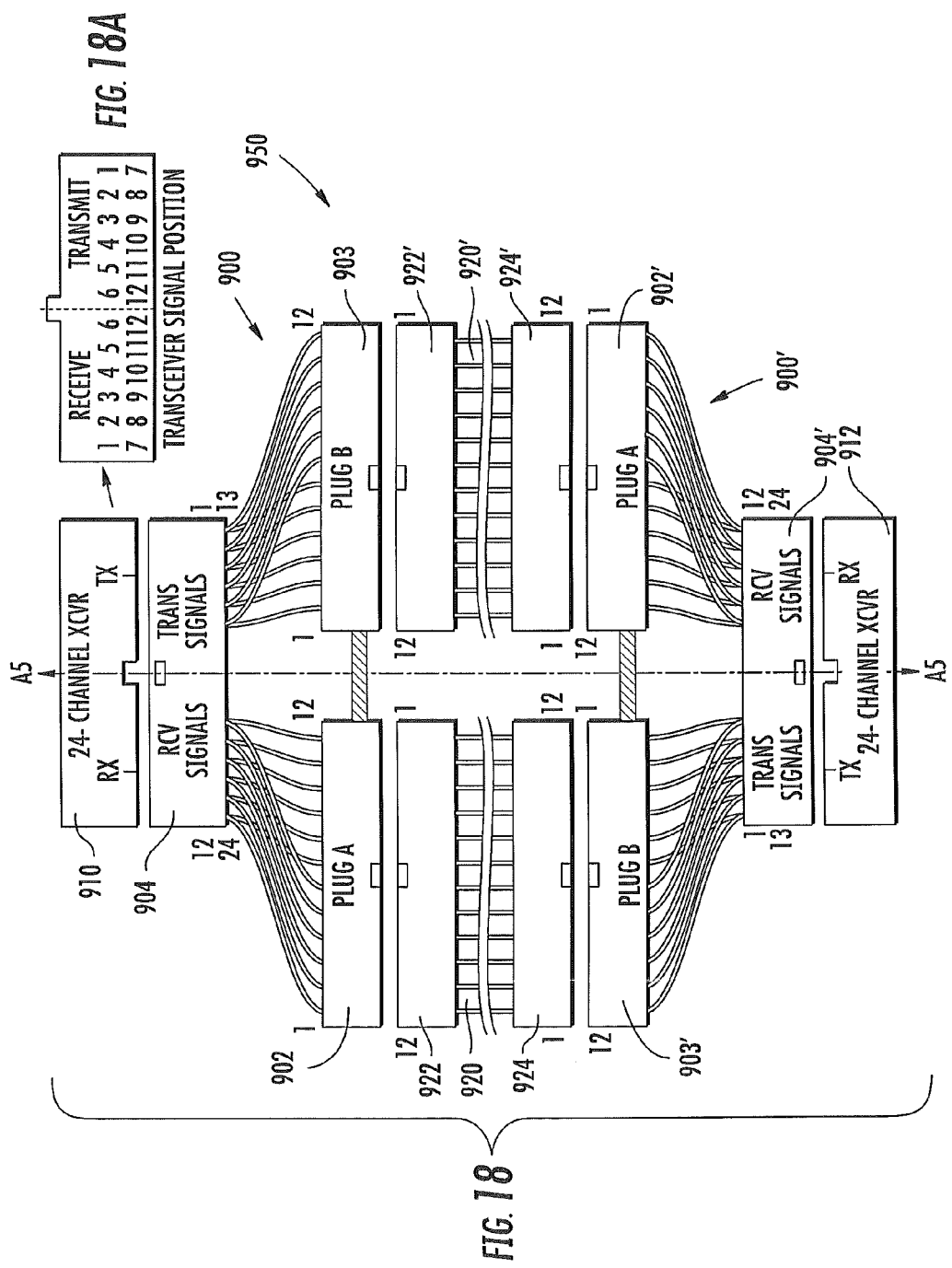

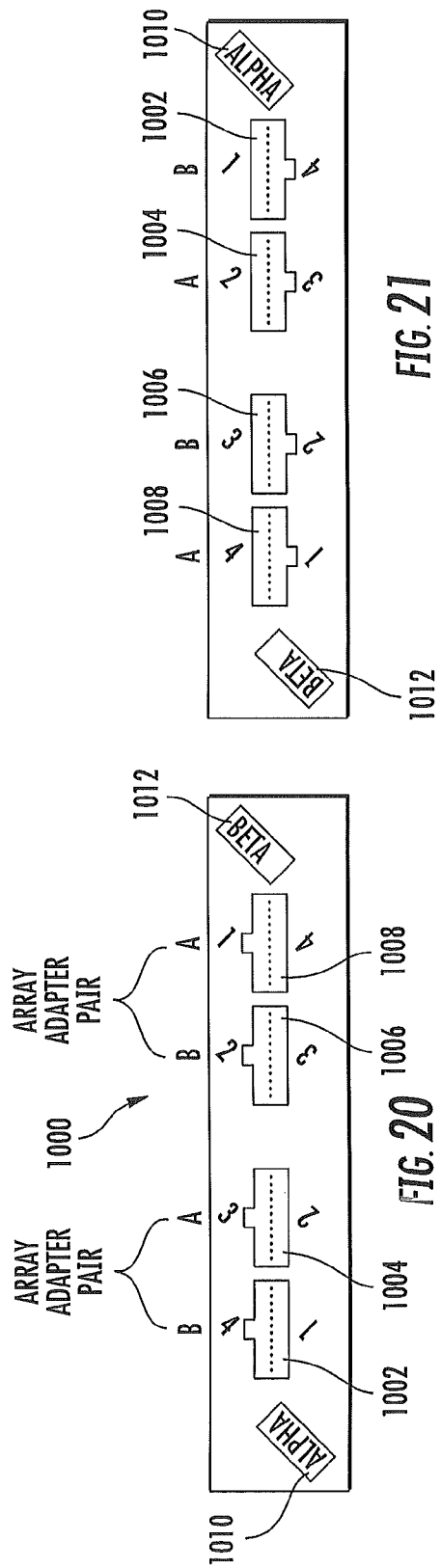

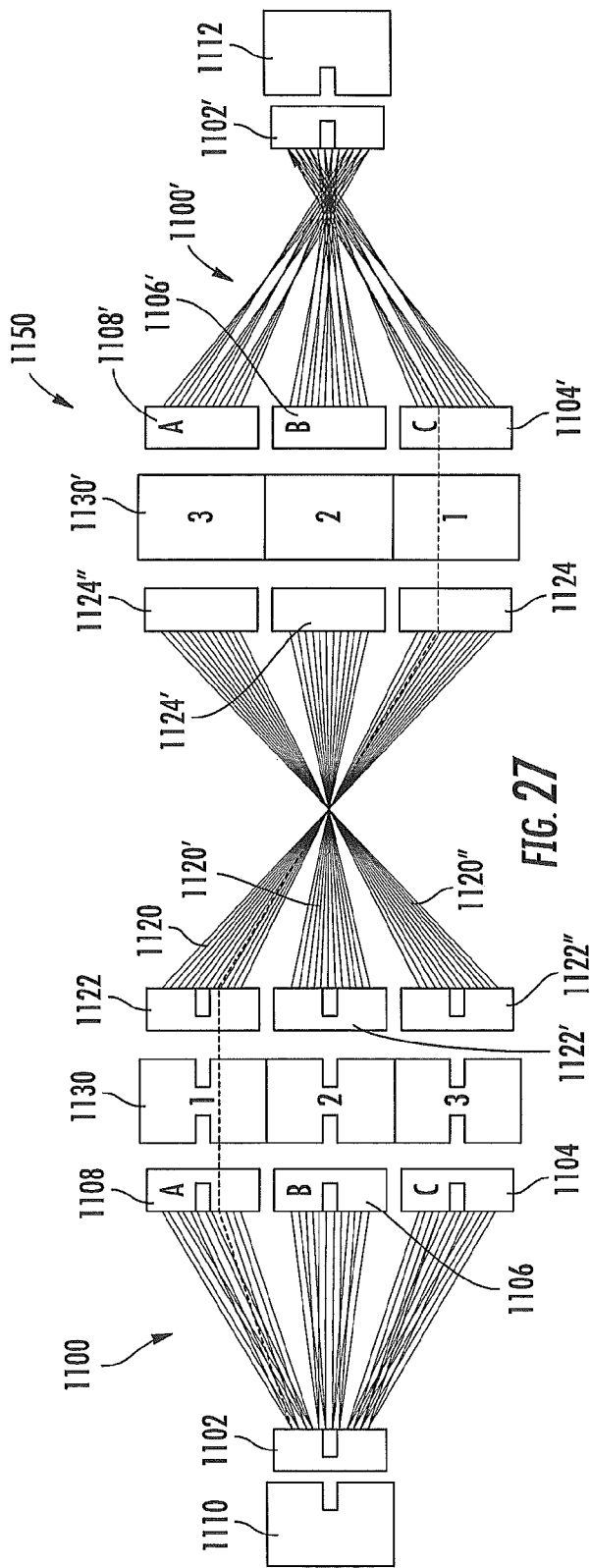
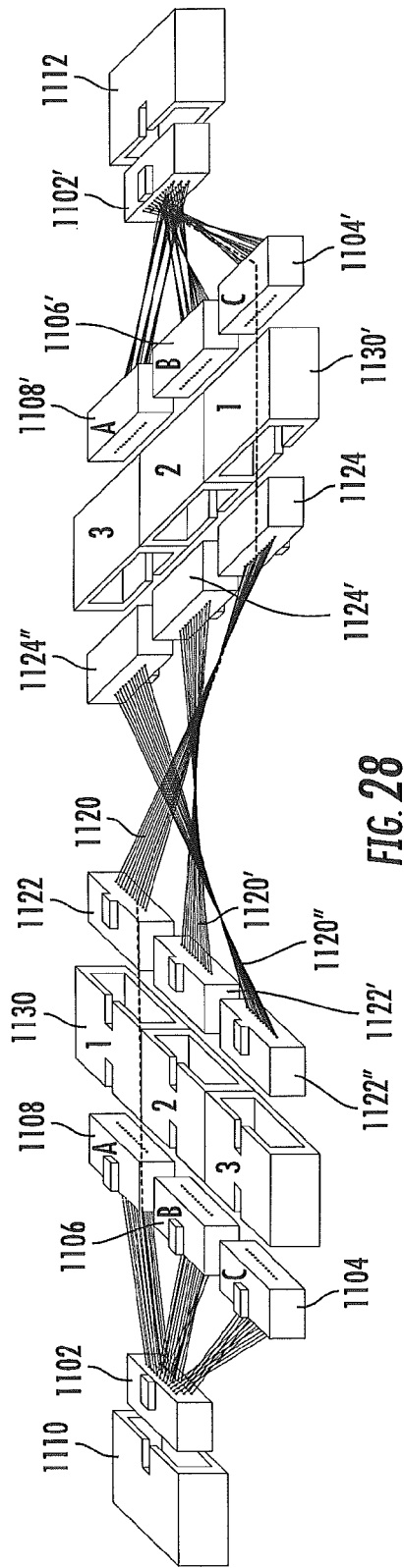
FIG. 27
FIG. 28

OPTICAL FIBER ARRAY CONNECTIVITY SYSTEM FOR MULTIPLE TRANSCEIVERS AND/OR MULTIPLE TRUNK CABLES

FIELD OF THE INVENTION

The present invention is directed generally to fiber optic multi-strand cables, connectors, adapters, and patching systems.

BACKGROUND OF THE INVENTION

Optical fibers, both multi-mode and single mode, are commonly used for the transmission of signals of all sorts, including communication and data signals. Communications systems often transmit signals between transceivers (i.e., devices that can both transmit and receive optical signals) via couplets of fibers. More specifically, one fiber of the couplet will transmit signals from the first transceiver to the second, and the other fiber of the couplet will transmit signals from the second transceiver to the first. In this manner, optical signals are not traveling along the same fiber in different directions.

This arrangement would be fairly simple to organize for two transceiver devices that are permanently optically connected, but in practice transceivers are typically connected through a much larger network of optical fibers, connectors and patch panels. For example, a common optical system includes multiple transceivers at one end, patch cord pairs that are connected to the transceivers and to a duplex adapter mounted on a patch panel, a fan-out unit connected to the duplex adapter that connects to a multi-strand fiber optic trunk cable (12 fibers per cable is common, and the fiber strands may be in ribbon form) via an array adapter, a second fan-out unit connected to the opposite end of the optic trunk cable via a second array adapter, and corresponding transceivers connected via patch cord pairs to the second fan-out unit through another duplex adapter. Thus, it is important to be able to track individual optical fibers in the various devices and cables between the transceivers in order to ensure that the individual transceivers are connected as desired.

To ensure intermateability of cabling components and signal polarity, standards have been created to define arrangements of fibers, cables, adapters and connectors. For example, one such standard for array connectors, TIA-604-5B, is directed to multi-fiber push-on (MPO) fiber optic connector intermateability. Another standard, TIA 568-B.3 with addendum No. 7 written by committee TR-42.8, is directed to maintaining optical fiber polarity with systems using array connectors and adapters, including MPOs. Systems built using these methods utilize fiber optic cables, adapters, transitions and patch cords that are typically partially or completely unique to one of these methods.

In some instances, transceivers may utilize less than all of the fibers of the trunk cable. For example, a transceiver may have only four channels, each of which has a "transmit" fiber and a "receive" fiber. Commonly, two such transceivers would utilize the outer four fibers on either end of a 12-fiber trunk cable; i.e., the transmit fibers would use fibers 1-4 of the trunk cable, and the receive fibers would use fibers 9-12 of the trunk cable. Thus, the devices would occupy only eight of the 12 fibers of a 12-fiber trunk cable, which would result in inefficient use of the trunk cable. However, adding more transceivers onto the trunk cable in order to utilize all of the trunk cable fibers may complicate the connection scheme. As such, it may be desirable to provide schemes and accompanying devices that enable multiple transceivers having fewer than 12 fibers to connect with proper polarity via an available 12-fiber trunk cable.

A different situation may also arise when a transceiver has more than 6 channels (12 fibers); for example, a pair of transceivers may have 12 or 18 channels. It may also be desirable to provide schemes and devices that enable such transceiver to utilize 12-fiber trunk cables.

SUMMARY OF THE INVENTION

As a first aspect, embodiments of the present invention are directed to a transition device for an optical fiber connection system adapted to interconnect a trunk cable with a plurality of transceivers. The transition device comprises: a first set of at least four optical fibers, each of the optical fibers having a trunk end and a transceiver end; a single trunk end terminal having a plurality of trunk ports arranged in a first row, each port connected with a respective one of the set of optical fibers at its trunk end, wherein a first axis of symmetry divides the ports; and a plurality of transceiver end terminals, each of the transceiver end terminals having at least one couplet of transceiver ports, each of the couplets of transceiver ports receiving a respective couplet of the set of optical fibers at their transceiver ends. The couplets of fibers received by each transceiver end terminal meet either of the following two conditions: (a) a first fiber of each couplet originates from a first port in the trunk end terminal, and a second fiber of each couplet originates from a second port in the trunk end terminal that is positioned to be the mirror image of the first port about the first axis of symmetry; or (b) each couplet of fibers is received in a first transceiver end terminal that has a corresponding second transceiver end terminal with the same number of transceiver ports, and each couplet of fibers received in the first transceiver end terminal originates from ports in the trunk end terminal that have mirror image ports about the first axis of symmetry from which fibers that are received in the second transceiver end terminal originate.

As a second aspect, embodiments of the present invention are directed to a telecommunications system comprising: a trunk cable comprising at least four optical fibers and terminals at opposite ends of the fibers, the terminals including a plurality of ports arranged in a row, each of the optical fibers being associated with a respective one of the trunk terminal ports; and two transition devices. Each of the transition devices comprises: a first set of at least four of optical fibers, each of the optical fibers having a trunk end and a transceiver end; a single trunk end terminal having a plurality of trunk ports arranged in a first row, each couplet of ports connected with a respective one of the set of optical fibers at its trunk end, wherein a first axis of symmetry divides the ports; and a plurality of transceiver end terminals, each of the transceiver end terminals having at least one couplet of transceiver ports, each of the couplets of transceiver ports connected with a respective couplet of the set of optical fibers at their transceiver ends. A first fiber of each couplet originates from a first port in the trunk end terminal, and a second fiber of each couplet originates from a second port in the trunk end terminal that is positioned to be the mirror image of the first port about the first axis of symmetry. The transition devices are connected to the opposite ends of the trunk cable such that the ports of the trunk cable terminals are aligned with the ports of the transition device trunk end terminals.

As a third aspect, embodiments of the present invention are directed to a transition device for an optical fiber connection system adapted to interconnect a plurality of trunk cables with a plurality of transceivers. The transition device comprises: a first set of at least twelve optical fibers, each of the optical fibers having a trunk end and a transceiver end; a single transceiver end terminal having a plurality of transceiver ports arranged in a multiple rows, each port connected with a respective one of the set of optical fibers at its transceiver end, wherein a first axis of symmetry divides the ports; and a plurality of trunk end terminals, each of the trunk end terminals having at least one couplet of trunk cable ports arranged in a single row, each of the couplets of trunk cable ports receiving a respective couplet of the set of optical fibers at their transceiver ends. The couplets of fibers received by each trunk end terminal meet either of the following two conditions: (a) a first fiber of each couplet originates from a first port in the transceiver end terminal, and a second fiber of each couplet originates from a second port in the transceiver end terminal that is positioned to be the mirror image of the first port about the first axis of symmetry; or (b) each couplet of fibers is received in a first trunk end terminal that has a corresponding second trunk end terminal with the same number of trunk cable ports, and each couplet of fibers received in the first trunk end terminal originates from ports in the transceiver end terminal that have mirror image ports about the first axis of symmetry from which fibers that are received in the second trunk end terminal originate.

As a fourth aspect, embodiments of the present invention are directed to a telecommunications system, comprising: at least two trunk cables comprising at least twelve optical fibers and terminals at opposite ends of the fibers, the terminals including a plurality of ports arranged in a row, each of the optical fibers being associated with a respective one of the trunk terminal ports; and two transition devices. Each of the transition devices comprises: a first set of at least twelve optical fibers, each of the optical fibers having a trunk end and a transceiver end; a single transceiver end terminal having a plurality of transceiver ports arranged in a multiple rows, each port connected with a respective one of the set of optical fibers at its transceiver end, wherein a first axis of symmetry divides the ports; and a plurality of trunk end terminals, each connected to one terminal of one of the trunk cables, each of the trunk end terminals having at least one couplet of trunk cable ports arranged in a single row, each of the couplets of trunk cable ports receiving a respective couplet of the set of optical fibers at their transceiver ends. The transition devices are configured such that the order of optical fibers within the trunk end terminals and the order of the trunk end terminals with respect to each other within both transition devices are arranged to produce the identical mirror image pattern of symmetry, the symmetry being achieved when transmitters and corresponding receivers are located in their respective mirror image positions about the centerline of a generally horizontally arranged array of the trunk end terminations.

BRIEF DESCRIPTION OF THE FIGURES

FIG. 18 is a schematic view of a telecommunications system that employs two transition devices of FIG. 17.

FIG. 18A is an end view of a transceiver of FIG. 18 showing the transmitting and receiving channel arrangement.

FIGS. 20-23 are end views of an exemplary patch panel that can be employed with devices such as those shown in FIGS. 16 and 19, wherein the patch panel is shown in inverted horizontal configurations (FIGS. 20 and 21) and inverted vertical configurations (FIGS. 22 and 22).

FIG. 24A is an end view of a transceiver of FIG. 24 showing the transmitting and receiving channel arrangement.

FIG. 27 is a top view of the system of FIG. 26 with the trunk cables and the fibers of one transition device inverted to facilitate maintenance and testing.

FIG. 28 is a perspective view of the system of FIG. 27.

DETAILED DESCRIPTION

Figure 1:
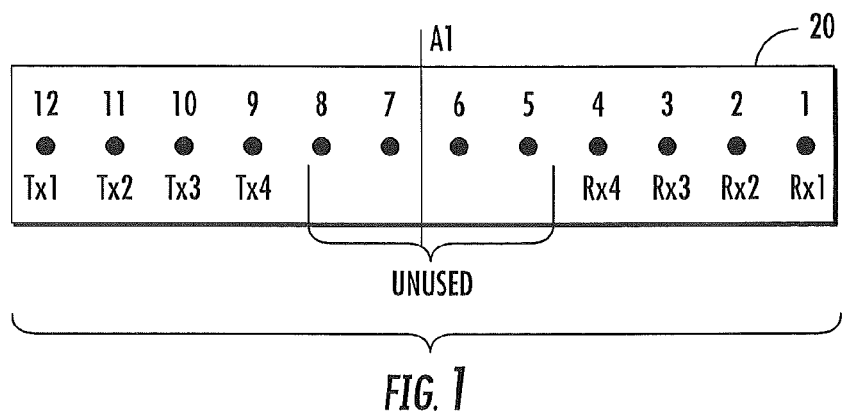
FIG. 1 is an end view of a fiber optic terminal showing only eight of twelve ports in use.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout, and the thickness of lines, layers and regions may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Turning now to the drawings, an exemplary fiber arrangement for a 12-fiber terminal of fiber optic system, designated broadly at 20, is shown in FIG. 1. As can be seen therein, the fiber arrangement includes ports 1 through 12 arranged in a single horizontal row. As indicated in FIG. 1, for a 4 channel transceiver that utilizes 8 fibers, fibers 1-4 may be used for receipt for channels 1-4, and fibers 9-12 may be used for transmission for channels 4-1. In such an instance, fibers 5-8 would be unused. The port arrangement of this transceiver contains an axis of symmetry, A1, that divides the interface between the center port positions 6 and 7. A mirror image exists about the axis A1 wherein each transmitter port can be associated with a corresponding receiver port located in the symmetrical position across the axis A1, and each unused port can be associated with a corresponding unused port located in the symmetrical position across the axis A1.

Figure 2:
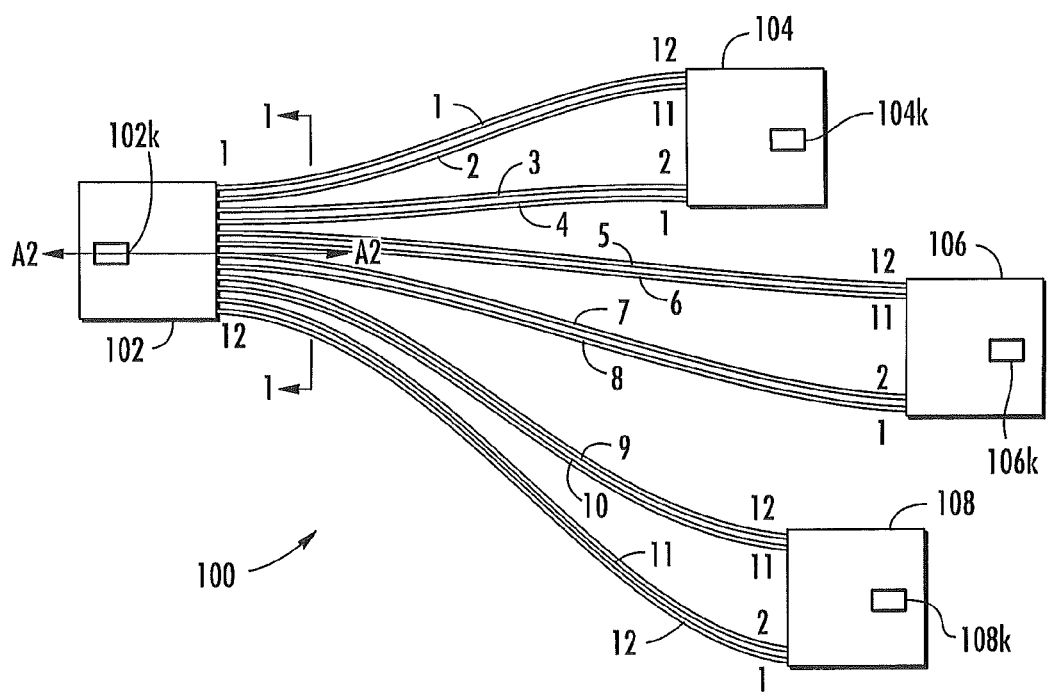
FIG. 2 is a top view of a transition device according to embodiments of the present invention.

Turning now to FIG. 2, a transition device in the form of a fan-out unit, designated broadly at 100, is shown therein. At one end, a terminal 102 that is configured to be connected with a 12-fiber trunk cable (such as cable 200 shown in FIG. 3) has twelve ports arranged in a row that are associated with twelve fibers 1-12. The trunk end terminal 102 includes an alignment key 102k on its upper surface to ensure proper alignment with the trunk cable (the configuration of the alignment key 102k will be well understood to those skilled in this art and need not be described in detail herein).

Referring still to FIG. 2, three terminals 104, 106, 108 are attached at the opposite ends of the fibers 1-12. Each of the terminals 104, 106, 108 may be sized to fit a 12-fiber adapter on a transceiver. However, each terminal receives only four of the 12 fibers that originate in the trunk end terminal 102. More specifically, fibers 1-4 are routed to the terminal 104, where they occupy, respectively, ports 12, 11, 2 and 1 of the terminal 104. Fibers 5-8 are routed to the terminal 106, where they occupy ports 12, 11, 2 and 1 thereof. Finally, fibers 9-12 are routed to the terminal 108 where they occupy ports 12, 11, 2 and 1 thereof. Also, each of the terminals 104, 106, 108 includes a respective alignment key 104k, 106k, 108k on its upper surface.

It can be seen that the terminals 104 and 108 receive fibers that originate from "mirror image" ports. More specifically, assuming the presence of an axis of symmetry A1 that extends vertically between the ports from which fibers 6 and 7 originate (see FIG. 1), fibers 1-4 connect with terminal 104, and mirror image fibers 9-12 (i.e., ports that are the mirror image of ports 1-4 across the axis of symmetry A2) connect with terminal 108. It can also be seen that the terminal 106 receives only fibers that originate from ports that have mirror image ports associated with other fibers received in the terminal 106. That is, fibers originating from ports 5 and 6 have mirror image fibers that originate from ports 7 and 8.

It has been discovered that, when a transition device has fibers and terminals that follow one of the two conditions described above, the transition device can be employed in a telecommunication system that includes multiple transceivers that require fewer than all of the fibers of a connecting trunk cable, and that the same transition device can be employed on both ends of the trunk cable (thereby simplifying manufacturing, connectivity, and the like). To restate the conditions to be met by the terminals and fibers, each of the transceiver end terminals either (a) receives couplets of fibers that originate from mirror image ports in the trunk end terminal (as is the case with the transceiver end terminal 106 described above), or (b) has a corresponding transceiver end terminal with the same number of ports, wherein the corresponding transceiver end terminal receives fibers that originate from mirror image ports in the trunk end terminal (as is the case with the transceiver end terminals 104, 108 above).

Figure 3:
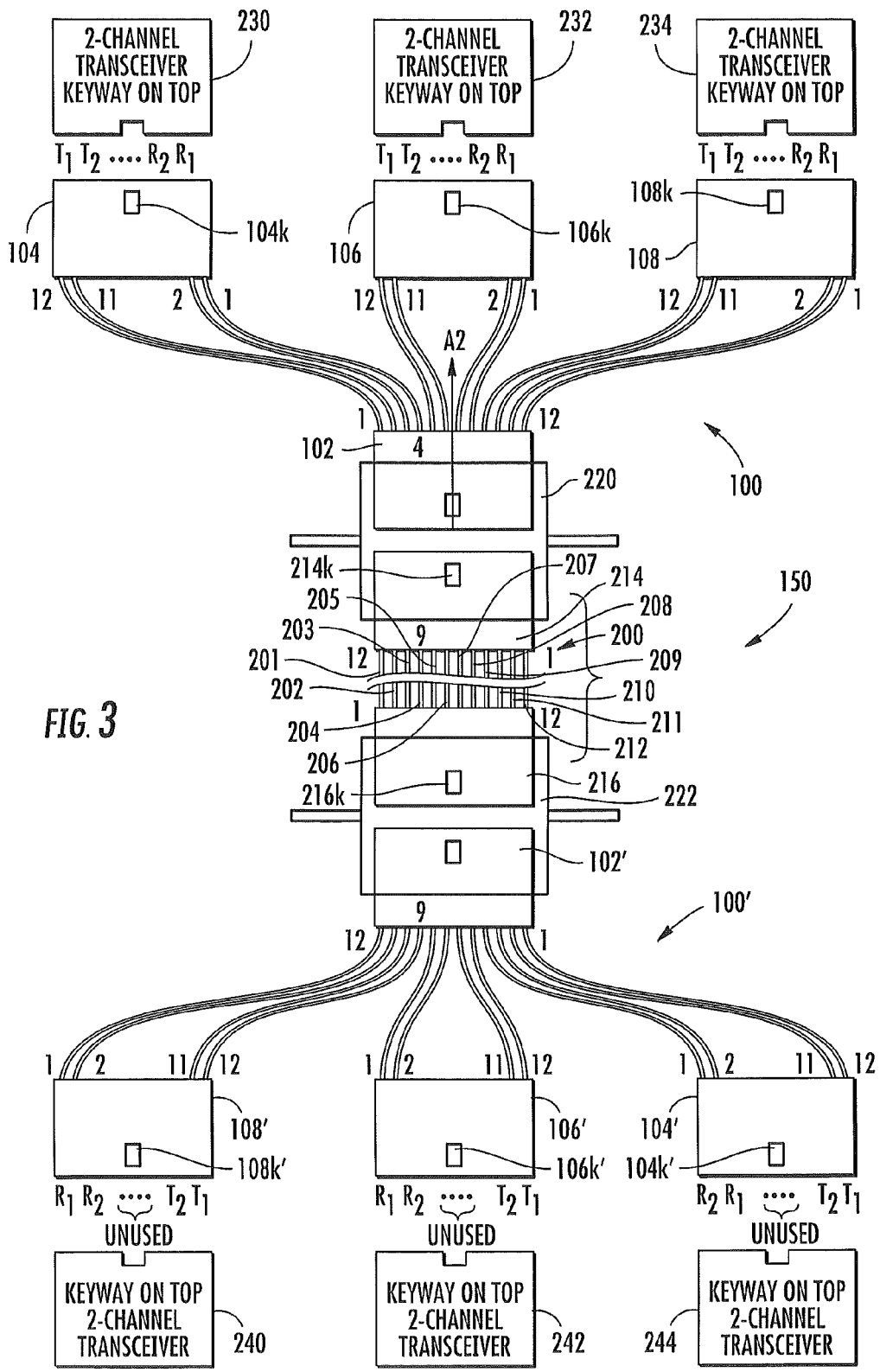
FIG. 3 is a top view of a telecommunications system that employs two transition devices of FIG. 2.

Referring now to FIG. 3, the use of transition devices of FIG. 2 in a telecommunications system, designated broadly at 150, is shown therein. The system 150 includes a trunk cable 200 that includes twelve optical fibers 201-212 that extend between terminals 214, 216. An exemplary trunk cable is discussed in U.S. Pat. No. 7,184,635 to Livingston, the disclosure of which is hereby incorporated herein in its entirety. Each of the terminals 214, 216 includes a key 214k, 216k on its upper surface. The terminals 214, 216 are inserted into "key-up to key-up" array adapters 220, 222 (e.g., MPO-type adapters). A transition device 100 is attached to the adapter 220 via the insertion of the trunk end terminal 102 into the adapter 220. The transceiver end terminals 104, 106, 108 are connected with, respectively, transceivers 230, 232, 234, with their keys 104k, 106k, 108k being received in corresponding "key-up to key-up" receptacles in the transceivers 230, 232, 234. The trunk end terminal 102' of a second identical transition device 100' is connected to the terminal 216 of the trunk cable 200 via the MPO adapter 222. Transceiver end terminals 108', 106', 104' are connected to transceivers 240, 242, 244 with their alignment keys 108k', 106k', 104k' received in receptacles therein. Notably, the fiber designated as fiber 1 in the transition device 100 extends from the leftmost port of the terminal 102, whereas the fiber designated as fiber 1 in the transition device 100' extends from the rightmost port of its terminal 102 because the transition device 100' is inverted 180 degrees from the orientation of transition device 100.

One can follow a signal to recognize that this arrangement enables the transceivers 230, 232, 234 to communicate with the transceivers 240, 242, 244. For example, starting at the leftmost port of the transceiver 230, a signal is transmitted from transmitter T1 and travels along the leftmost fiber (labeled fiber 12 in FIG. 3) that exits transceiver end terminal 104 to the port labeled position 1 in the trunk end terminal 102. From here, the signal travels through the terminal 214 of the trunk cable 200 to the leftmost fiber 201 thereof. Continuing along this path, the signal exits the leftmost port of the terminal 216 and enters the leftmost port of the trunk end terminal of the transition device 100' (labeled position 12 in FIG. 3). The signal then travels along the leftmost fiber to the terminal 108' of the transition device, entering the leftmost port (labeled 1 in FIG. 3), where it reaches receiver R1 of the transceiver 240.

A return signal can then be transmitted from transmitter T1 of transceiver 240 to receiver R1 of the transceiver 230. The signal generated by T1 travels through the rightmost port (labeled position 12 in FIG. 3) of the transceiver end terminal 108' of the transition device 100', then through the rightmost fiber exiting the terminal 108' to the fourth port from the left (labeled position 9 in FIG. 3) of the trunk end terminal 102'. The signal then enters the terminal 216 of trunk cable 200 at the fourth position from the left and travels through the corresponding fiber 204 to the terminal 214, exiting the port (labeled 9 in FIG. 3) that is fourth from the left. The signal then enters the trunk end terminal 102 of the transition device 100 through the fourth port from the left (labeled position 4 in FIG. 3) and travels along the rightmost fiber connected to the terminal 104 and enters the rightmost port thereof (labeled position 1). From there, the signal passes through the terminal 104, enters the transceiver 230, and is received in the receiver R1. Thus, signals can be passed from the transmitter T1 of transceiver 230 to the receiver R1 of transceiver 240, and from the transmitter T1 of transceiver 240 to the receiver R1 of transceiver 230, thereby forming a complete transmit/receive channel between these devices.

Similar tracing of the signal paths of transmitter T2 of transceiver 230 to receiver R2 of transceiver 240 and of transmitter T2 of transceiver 240 to receiver 142 of transceiver 230 shows the presence of another complete transmit/receive channel. The same exercise can show that the transceivers 232, 242 form two transmit/receive channels, as do transceivers 234, 244. As such, the interconnection of the transceivers in a "key-up to key-up" arrangement can be accomplished with two identical transition devices 100, 100', even though the transceivers each use only four of the twelve available fibers of the trunk cable 200.

Figure 4:
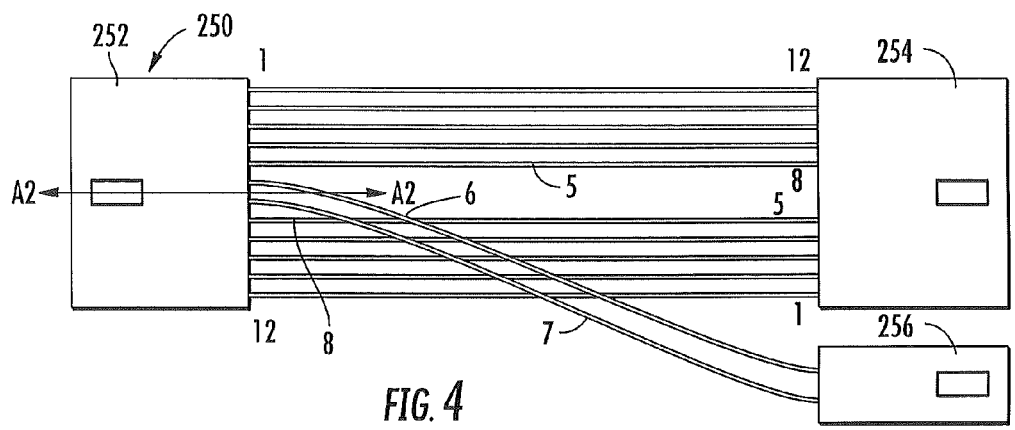
FIG. 4 is a top view of a transition device according to alternative embodiments of the present invention.

Transition devices that meet the two conditions (a) and (b) set forth above can also take other configurations. Referring now to FIG. 4, a transition device 250 includes a trunk end terminal 252, a transceiver end terminal 254 that receives 10 of the 12 fibers that originate at the trunk end terminal 252, and a transceiver end terminal 256 that receives the other 2 fibers from the trunk end terminal 252. As can be seen in FIG. 4, the transceiver end terminal 254 receives fibers 1-5 and 8-12 (which are sets of mirror image fibers), and transceiver end terminal 256 receives fibers 6 and 7, which are also mirror image fibers. As such, both terminals meet condition (a) above, with the result that proper polarity for attached transceivers can be maintained using two of these devices on either end of a trunk cable such as trunk cable 200.

Figure 5:
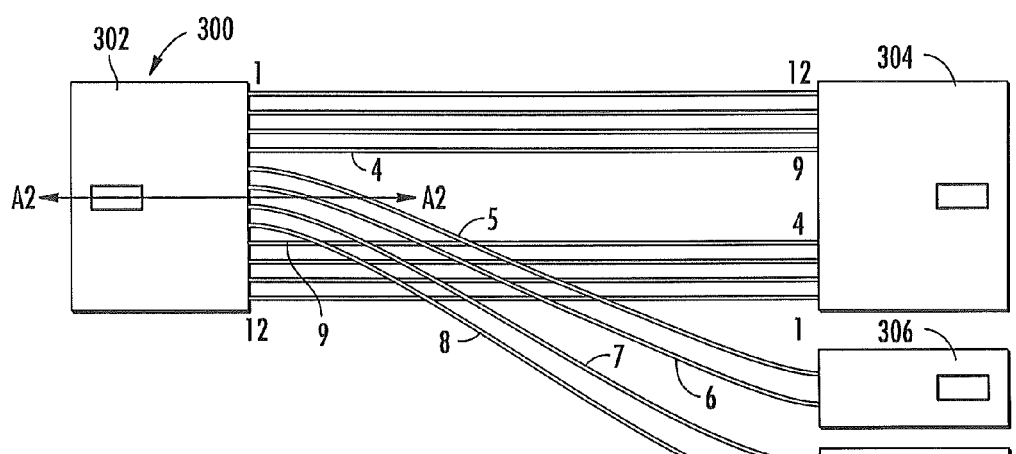
FIG. 5 is a top view of a transition device according to additional embodiments of the present invention.

Referring now to FIG. 5, another transition device, designated broadly at 300, is illustrated therein. The device 300 includes a trunk end terminal 302 and three transceiver end terminals 304, 306, 308. Transceiver end terminal 304 receives eight fibers from trunk end terminal 302: fibers 1-4 and mirror image fibers 9-12. Transceiver end terminals 306, 308 receive two fibers each from trunk end terminal 302; transceiver end terminal 306 receives fibers 5 and 6, and transceiver end terminal 308 receives fibers 7 and 8 that are mirror image fibers of fibers 5 and 6. Thus, the transceiver end terminal 304 meets condition (a) above, and transceiver end terminals 306, 308 meet condition (b) above, so the device 300 can maintain proper polarity for attached transceivers if two such devices were attached at the ends of a trunk cable such as trunk cable 200.

Figure 6:
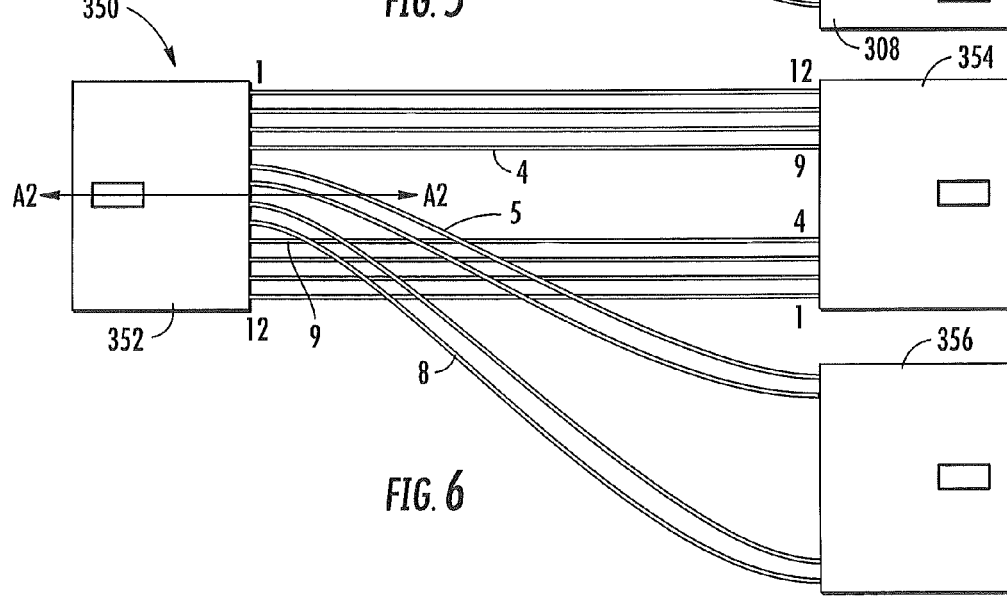
FIG. 6 is a top view of a transition device according to further embodiments of the present invention.

Referring now to FIG. 6, a device 350 includes a trunk end terminal 352, an eight fiber (four channel) terminal 354, and a four fiber (two channel) terminal 356. The fibers of transceiver end terminal 354 originate from ports 1-4 and 9-12 of trunk end terminal 352, thus satisfying condition (a) above, and the fibers of transceiver end terminal 356 originate from ports 5-8, thus also satisfying condition (a). As such, two of these devices can maintain proper polarity for attached transceivers if used at opposite ends of a trunk cable such as trunk cable 200.

Figure 7:
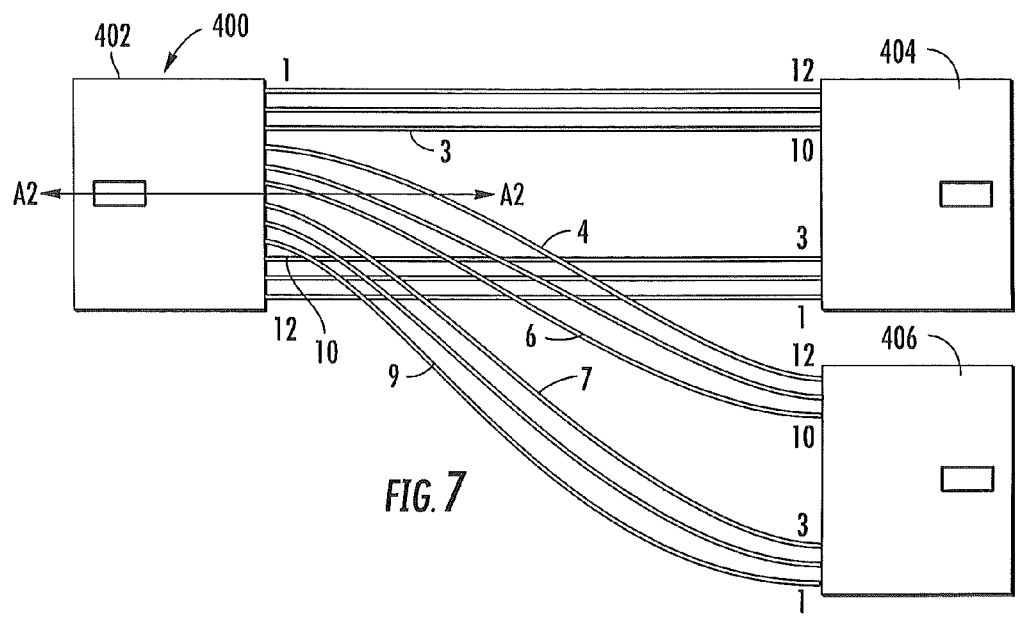
FIG. 7 is a top view of a transition device according to other embodiments of the present invention.

Turning now to FIG. 7, a device 400 includes a trunk end terminal 402, a six fiber transceiver end terminal 404 that receives fibers 1-3 and 10-12 from terminal 402, and a six fiber transceiver end terminal 406 that receives fibers 4-9 from terminal 402. Because both transceiver end terminals 404, 406 satisfy condition (a), two of the devices 400 may be used on either end of a trunk cable such as trunk cable 200 and maintain proper polarity for attached transceivers.

Figure 8:
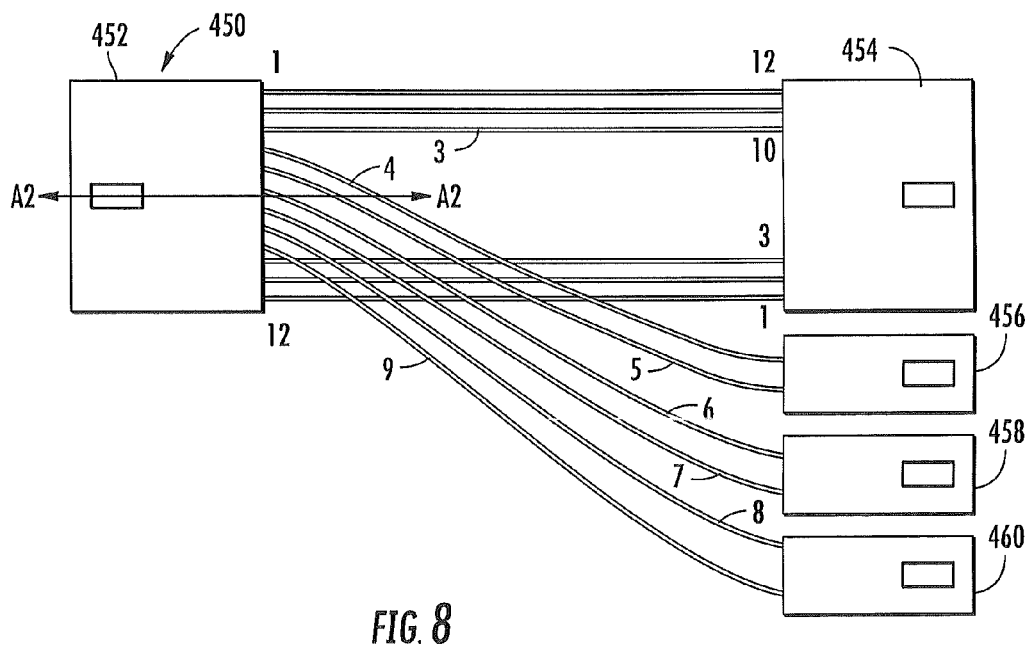
FIG. 8 is a top view of a transition device according to still further embodiments of the present invention.

Referring now to FIG. 8, a device 450 has a trunk end terminal 452, a six-fiber transceiver end terminal 454, and three two-fiber transceiver end terminals 456, 458, 460. The transceiver end terminal 454 receives fibers 1-3 and 10-12 from trunk end terminal 452, satisfying condition (a). The transceiver end terminals 456 and 460 receive, respectively, the fibers 4 and 5 and the fibers 8 and 9, which are mirror image fibers, thereby satisfying condition (b). Transceiver end terminal 458 receives fibers 6 and 7, which satisfies condition (a). Because all of the transceiver end terminals 454, 456, 458, 460 satisfy either condition (a) or condition (b), two devices 450 can be attached to either end of a trunk cable such as trunk cable 200 and maintain proper polarity for attached transceivers.

Figure 9:
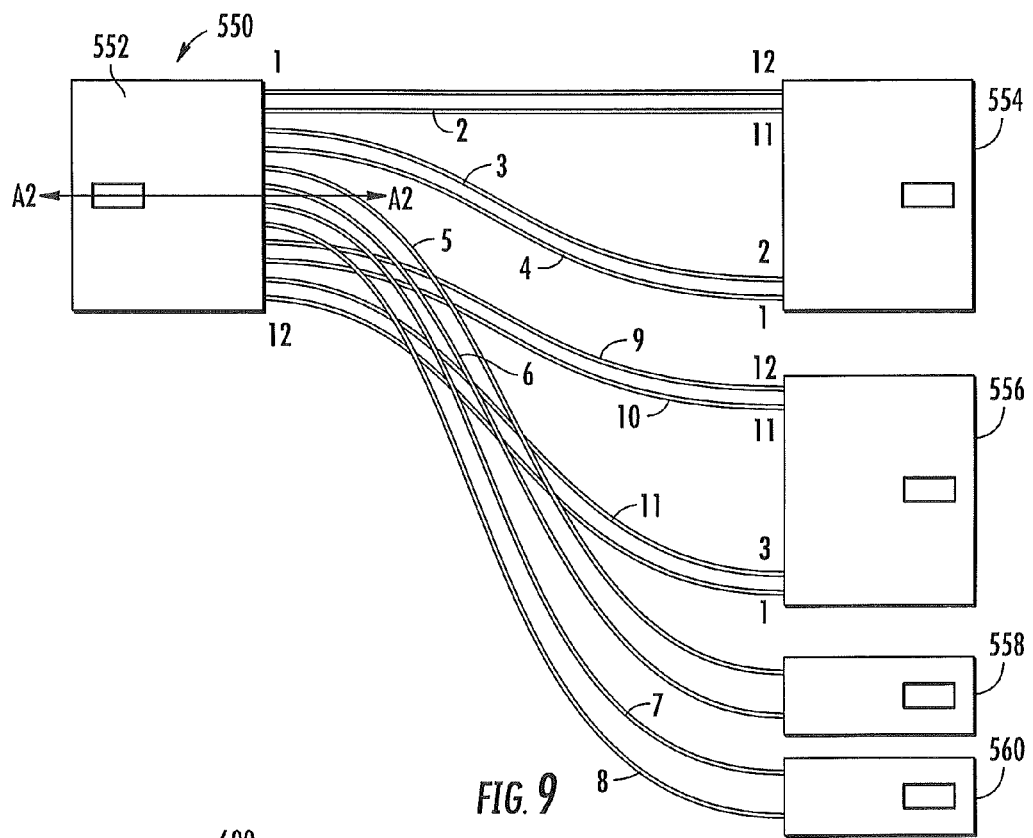
FIG. 9 is a top view of a transition device according to yet further embodiments of the present invention.

Referring now to FIG. 9, a device 550 disclosed therein includes a trunk end terminal 552, two transceiver end terminals 554, 556, each of which receives four fibers, and two transceiver end terminals 558, 560, each of which receives two fibers. The transceiver end terminal 554 receives fibers 1-4, while the transceiver end terminal 556 receives mirror image fibers 9-12, such that these two transceiver end terminals 554, 556 satisfy condition (b) above. The transceiver end terminal 558 receives fibers 5 and 6 and the transceiver end terminal 560 receives mirror image fibers 7 and 8, such that these two transceiver end terminals 558, 560 also satisfy condition (b). As such, two devices 550 can be attached to the ends of a trunk cable such as trunk cable 200 and provide proper polarity for attached transceivers.

Figure 10:
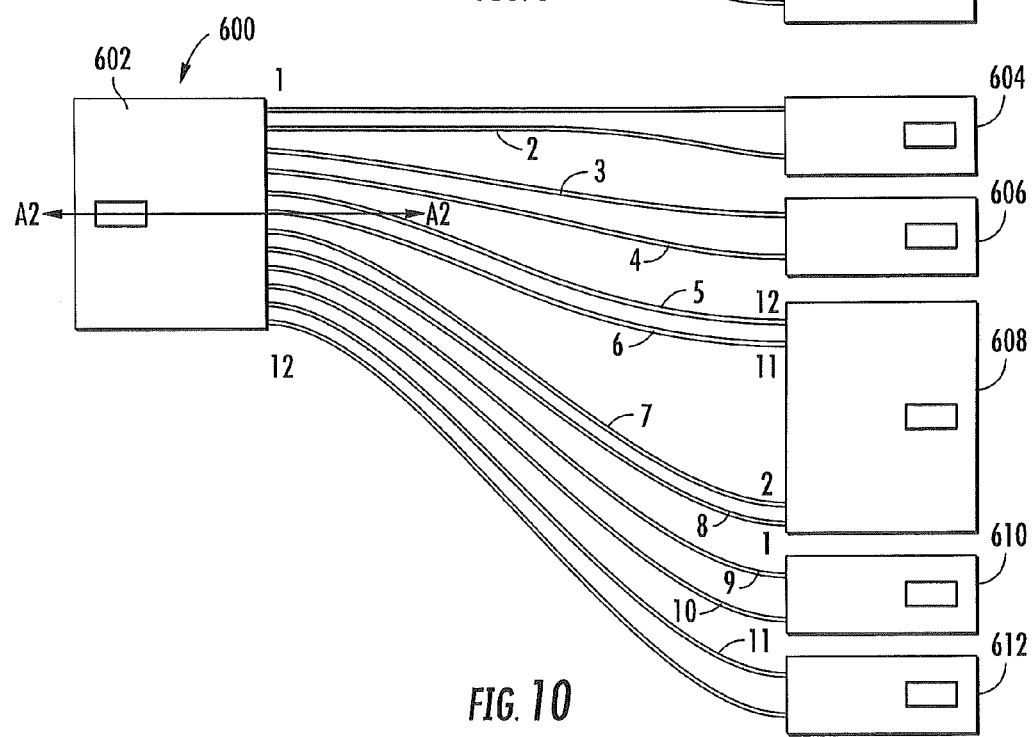
FIG. 10 is a top view of a transition device according to still further embodiments of the present invention.

FIG. 10 illustrates a transition device 600, which includes a trunk end terminal 602, four two fiber transceiver end terminals 604, 606, 610, 612, and a four fiber transceiver end terminal 608. The transceiver end terminals 604 and 612 receive mirror image couplets of fibers 1 and 2 and fibers 11 and 12, respectively. The transceiver end terminals 606 and 610 receive mirror image couplets of fibers 3 and 4 and fibers 9 and 10, respectively. The transceiver end terminal 608 receives fibers 5-8. Because the terminals 604, 606, 610 and 612 meet condition (b), and terminal 608 meets condition (a), two devices 600 can maintain proper polarity for attached transceivers when used on either end of a trunk cable such as trunk cable 200.

Figure 11:
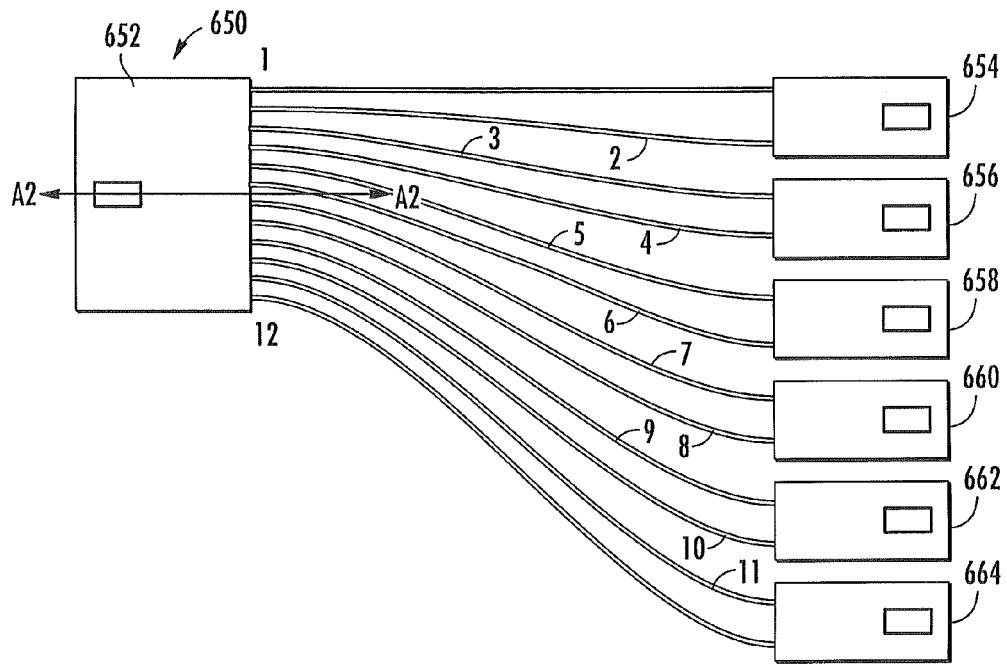
FIG. 11 is a top view of a transition device according to additional embodiments of the present invention.

Referring now to FIG. 11, the device 650 illustrated therein includes a trunk end terminal 652 and six transceiver end terminals 654, 656, 658, 660, 662, 664. The transceiver end terminals 654, 656, 658, 660, 662, 664 receive, respectively, fiber couplets 1 and 2, 3 and 4, 5 and 6, 7 and 8, 9 and 10, and 11 and 12. Transceiver end terminals 654 and 664 receive mirror image fibers, as do transceiver end terminals 656, 662 and transceiver end terminals 658, 660. Because all of the transceiver end terminals meet condition (b), two devices 650 may be employed on either end of a trunk cable such as trunk cable 200 and maintain proper polarity for attached transceivers.

Figure 12:
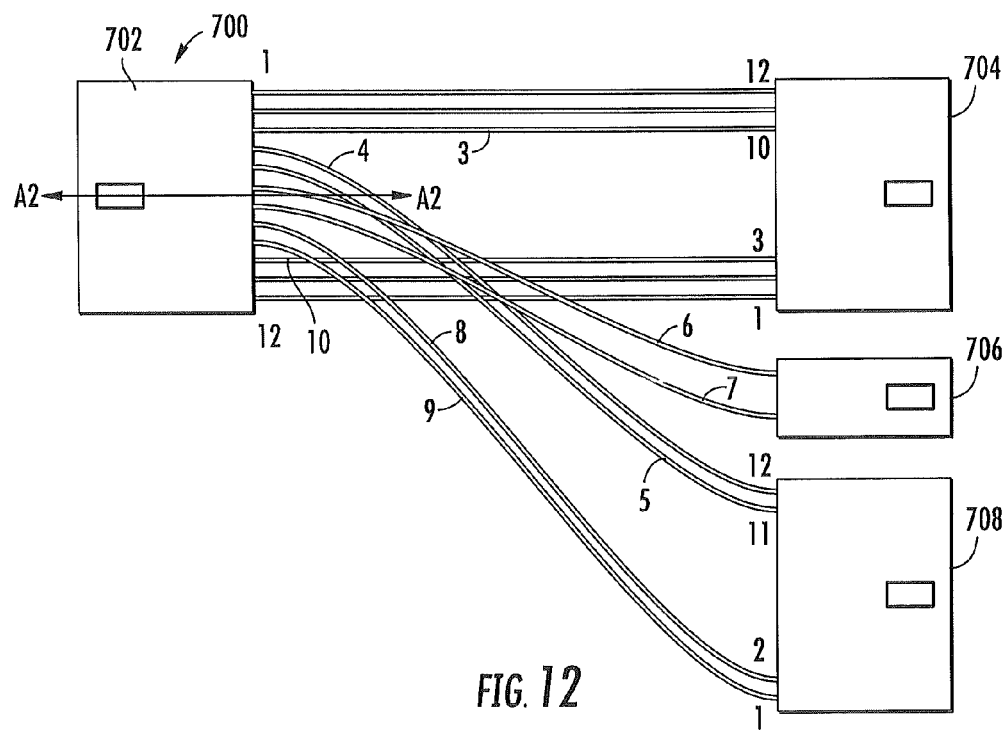
FIG. 12 is a top view of a transition device according to further embodiments of the present invention.

FIG. 12 illustrates a device 700 that includes a trunk end terminal 702 and three transceiver end terminals: a six fiber terminal 704; a two fiber terminal 706; and a four fiber terminal 708. The transceiver end terminal 704 receives mirror image fibers 1-3 and 10-12, the terminal 706 receives mirror image fibers 6 and 7, and the transceiver end terminal 708 receives mirror image fibers 4, 5, 8, and 9. Because all three transceiver end terminals 704, 706, 708 meet condition (a), the device 700 is suitable for use at either end of a trunk cable such as trunk cable 200 to maintain proper polarity for attached transceivers.

Figure 13:
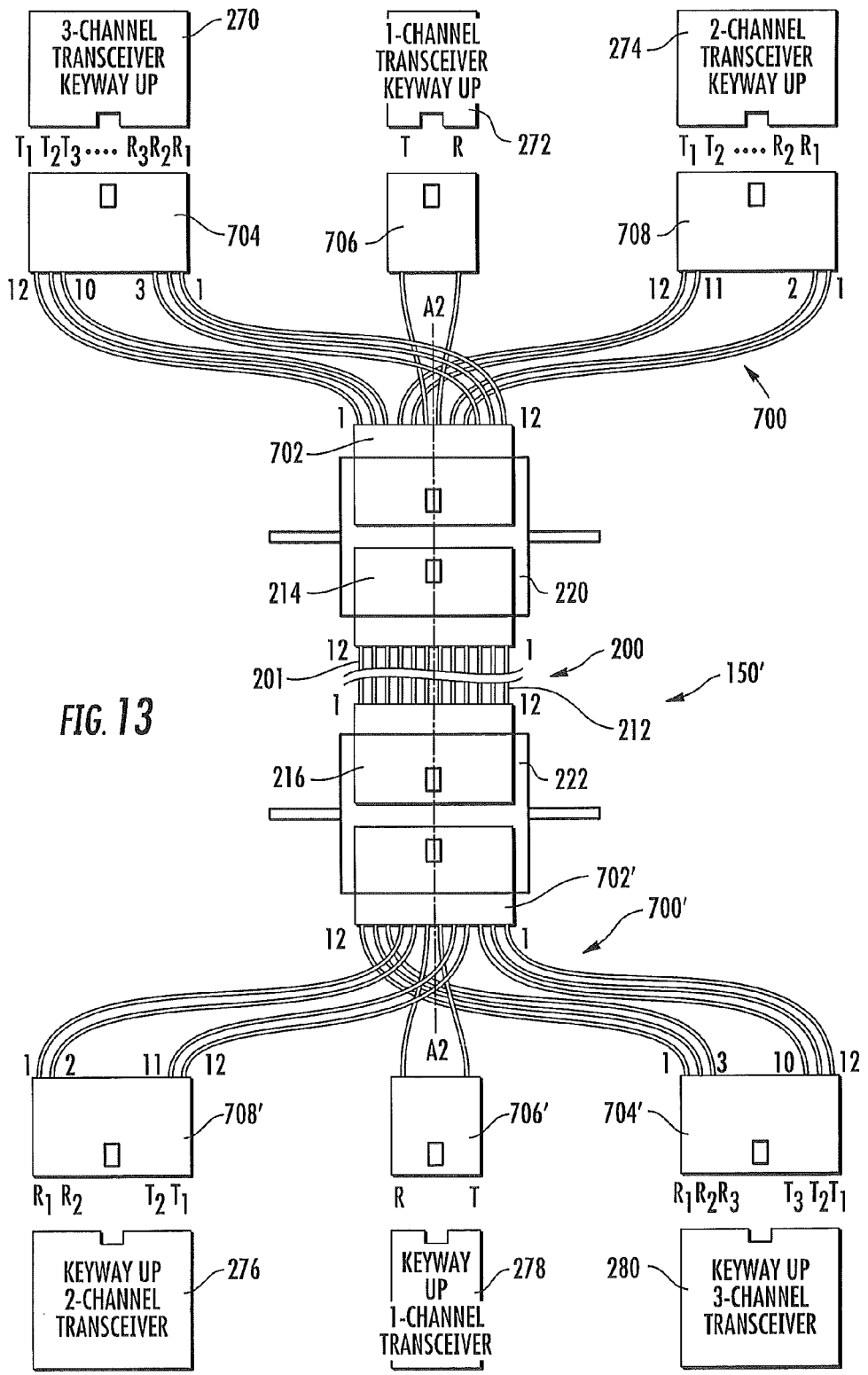
FIG. 13 is a top view of telecommunications system that employs two transition devices of FIG. 12.

FIG. 13 illustrates a communication system 150' that employs two identical devices 700, 700' that connect transceivers 270, 272, 274 with transceivers 280, 278, 276, respectively, through a trunk cable 200. The maintenance of polarity between the transceivers can be seen by tracing a signal through each of the proposed channels. For example, starting with the leftmost port of the six-fiber transceiver 270, a signal is transmitted from transmitter T1 through the transceiver end terminal 704 and travels along the leftmost fiber (labeled fiber 12 in FIG. 13) that exits transceiver end terminal 704 to the port labeled position 1 in the trunk end terminal 702. From here, the signal travels through the terminal 214 of the trunk cable 200 to the leftmost fiber 201 thereof. Continuing along this path, the signal exits the leftmost port of the terminal 216 and enters the leftmost port of the trunk end terminal 702' of the transition device 700' (labeled position 12 in FIG. 13). The signal then travels along the leftmost fiber to the terminal 704' of the transition device 700', entering the leftmost port (labeled 1 in FIG. 13), where it reaches receiver R1 of the transceiver 280.

A return signal can then be transmitted from transmitter T1 of transceiver 280 to receiver R1 of the transceiver 270. The signal generated by T1 travels through the rightmost port (labeled position 12 in FIG. 13) of the transceiver end terminal 704' of the transition device 700', then through the rightmost fiber exiting the terminal 704' to the rightmost port (labeled position 1 in FIG. 13) of the trunk end terminal 702'. The signal then enters the terminal 216 of trunk cable 200 at the rightmost position and travels through the corresponding fiber 212 to the terminal 214, exiting the rightmost port (labeled 1 in FIG. 13). The signal then enters the trunk end terminal 702 of the transition device 700 through the rightmost port (labeled position 12 in FIG. 13), travels along the rightmost fiber connected to the terminal 704, and enters the rightmost port thereof (labeled position 1). From there, the signal passes through the terminal 704, enters the transceiver 270, and is received in the receiver R1. Thus, signals can be passed from the transmitter T1 of transceiver 270 to the receiver R1 of transceiver 280, and from the transmitter T1 of transceiver 280 to the receiver R1 of transceiver 270, thereby forming a complete transmit/receive channel between these devices.

Similar tracing of the signal paths of transmitters T2 and T3 of transceiver 270 to receivers R2 and R3 of transceiver 280 and of transmitters T2 and T3 of transceiver 280 to receivers R2 and R3 of transceiver 270 shows the presence of two more complete transmit/receive channels. The same exercise can show that the transceivers 272, 278 form one transmit/receive channel, and transceivers 274, 276 form two transmit/receive channels. As such, the interconnection of the transceivers in a "key-up to key-up" arrangement can be accomplished with two identical transition devices 700, 700'.

Figure 14:
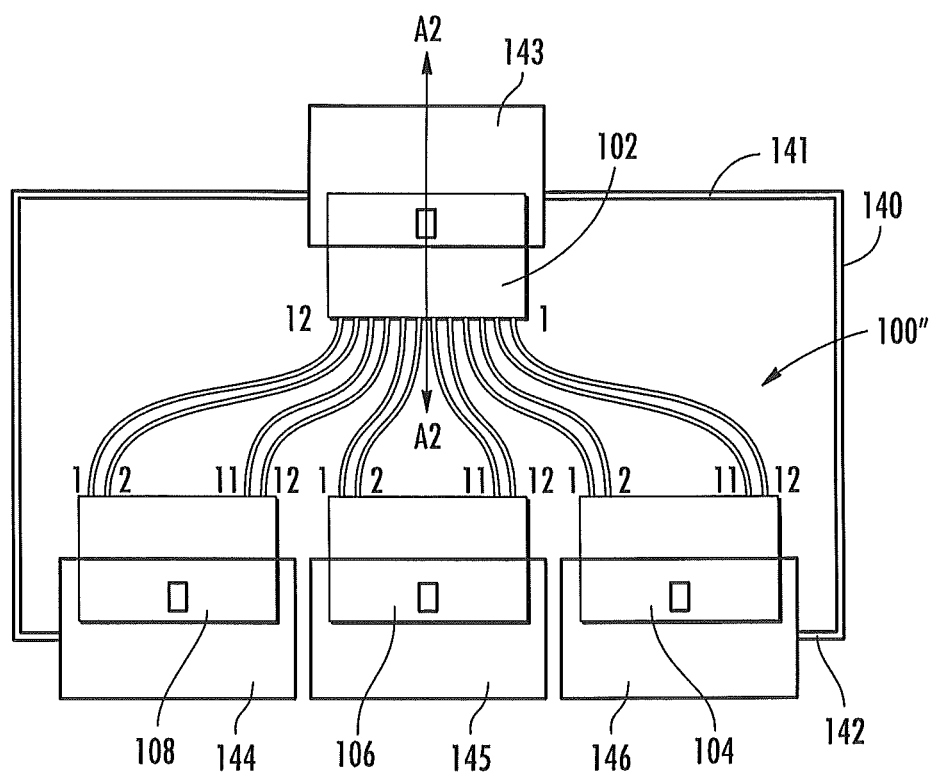
FIG. 14 is a schematic top view of the transition device of FIG. 2 embodied as a cassette.

Turning now to FIG. 14, a transition device 100" is shown in the form of a cassette, with a housing 140 having a wall 141 in which an adapter 143 and the trunk end terminal 102 are mounted and an opposing wall 142 in which adapters 144, 145, 146 and the transceiver end terminals 104, 106, 108 are mounted. This configuration may be preferred for some applications. In other applications, a fan-out configuration, in which the terminals are not mounted in a wall, but instead are freely movable relative to each other, may be preferred.

Figure 15:
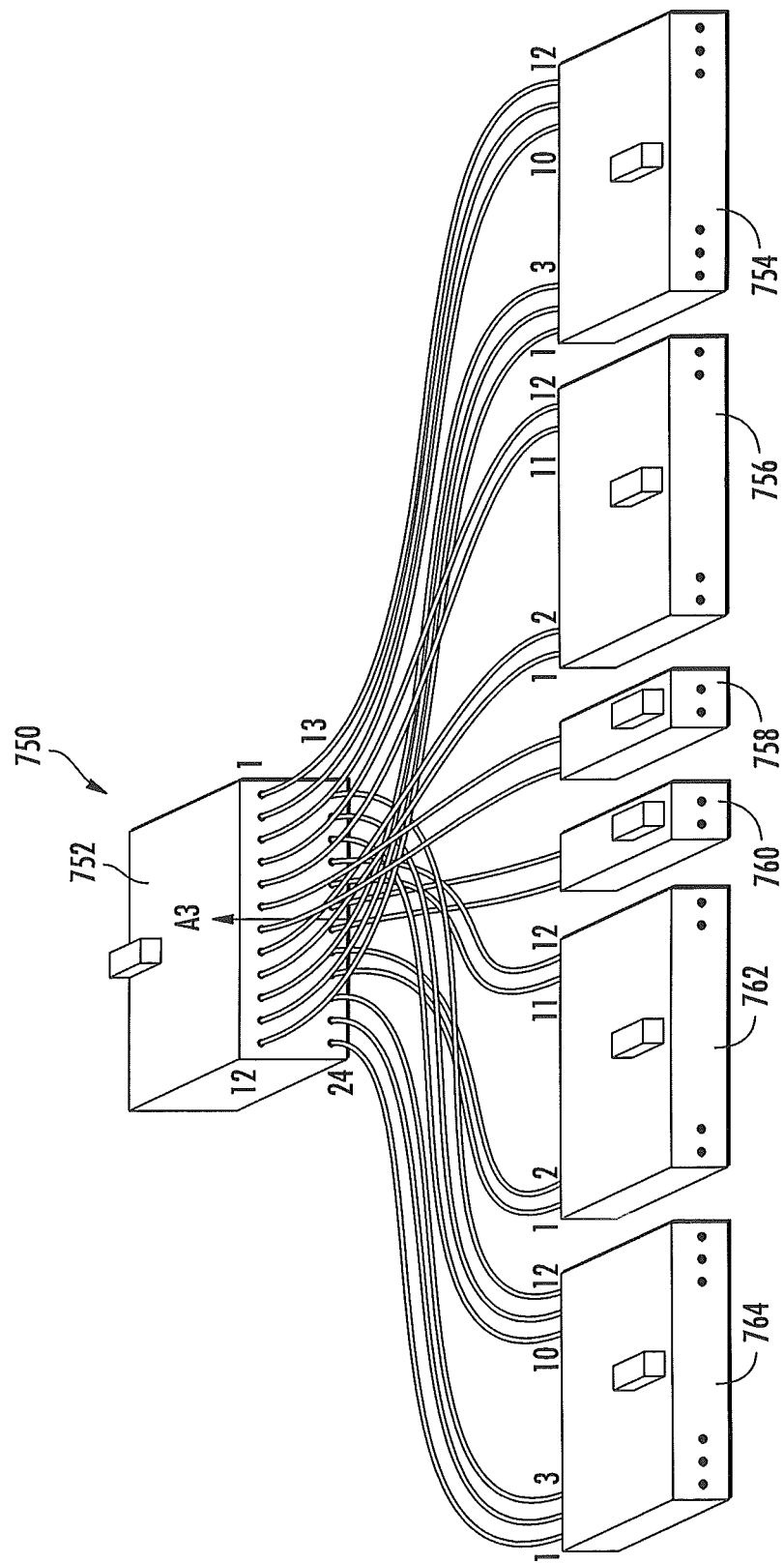
FIG. 15 is a schematic perspective view of a transition device according to embodiments of the present invention that has upper and lower rows of ports in its trunk end terminal.

Referring now to FIG. 15, a transition device 750 is illustrated therein. The device 750 differs from the previously discussed devices in that it has 24, rather than 12, fibers, and these fibers are arranged in two rows rather than one. The device 750 includes a trunk end terminal 752 from which the fibers originate. The trunk end terminal 752 is configured to connect with a 24-fiber trunk cable. In FIG. 15, the upper row of fibers is labeled 1-12 from right to left, and the lower row of fibers is labeled 13-24 from right to left. The device 752 includes six transceiver end terminals: terminals 754 and 764 that receive six fibers each; terminals 756 and 762 that receive four fibers each; and terminals 758 and 760 that receive two fibers each. In the device 750 the fibers are routed from the trunk end terminal 752 to the transceiver end terminals 754-764 in a pattern that repeats on each row to illustrate stacking the routing of the transition device of FIG. 12 within a multi-row trunk end terminal. Any of the transition device routings of FIGS. 2 and 4-12 may be mixed within the multi-row trunk terminal, each one occupying a row unto itself. In such arrangements, the complete transition device exhibits an axis of symmetry A2 and the rows comply with condition (a). When the rows exhibit symmetry along a vertical axis A3, as is illustrated in FIG. 15, each of the transceiver end terminals has a corresponding transceiver end terminal that receives mirror image fibers. For example, transceiver end terminal 754 receives fibers 1-3 and 10-12; its corresponding transceiver end terminal 764 receives fibers 13-15 and 22-24, which are mirror image fibers to fibers 1-3 and 10-12 across the axis A2. Similarly, the transceiver end terminal 756 receives fibers 4, 5, 8 and 9, while its corresponding transceiver end terminal 762 receives mirror image fibers 16, 17, 20 and 21. Finally, transceiver end terminal 758 receives fibers 6 and 7, while corresponding transceiver end terminal 760 receives mirror image fibers 18 and 19. Thus, each of the transceiver end terminals of the device 750 also meets condition (b) above, even though the device 750 has its fibers arranged in two rows on the trunk end terminal 752.

Figure 16:
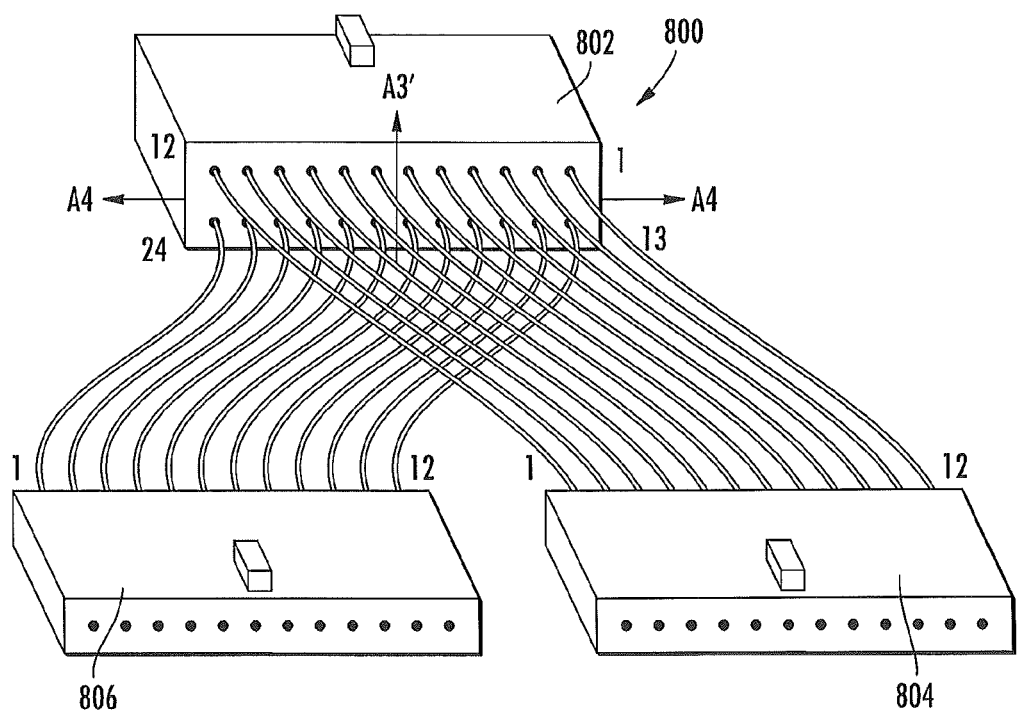
FIG. 16 is a schematic perspective view of a transition device according to embodiments of the present invention that has fibers divided by a horizontal axis of symmetry.

An alternative 24-fiber transition device is shown in FIG. 16 and designated broadly at 800. The device 800 has a trunk end terminal 802 with 24 fibers originating from two rows. Two transceiver end terminals 804, 806 receive twelve fibers each, with the transceiver end terminal 804 receiving fibers 1-12 and the transceiver end terminal 806 receiving fibers 13-24. Because these sets of fibers are mirror images of each other about a horizontal axis A4 that splits the rows of fibers, the transceiver end terminals 804, 806 meet condition (b) above.

Figure 17:
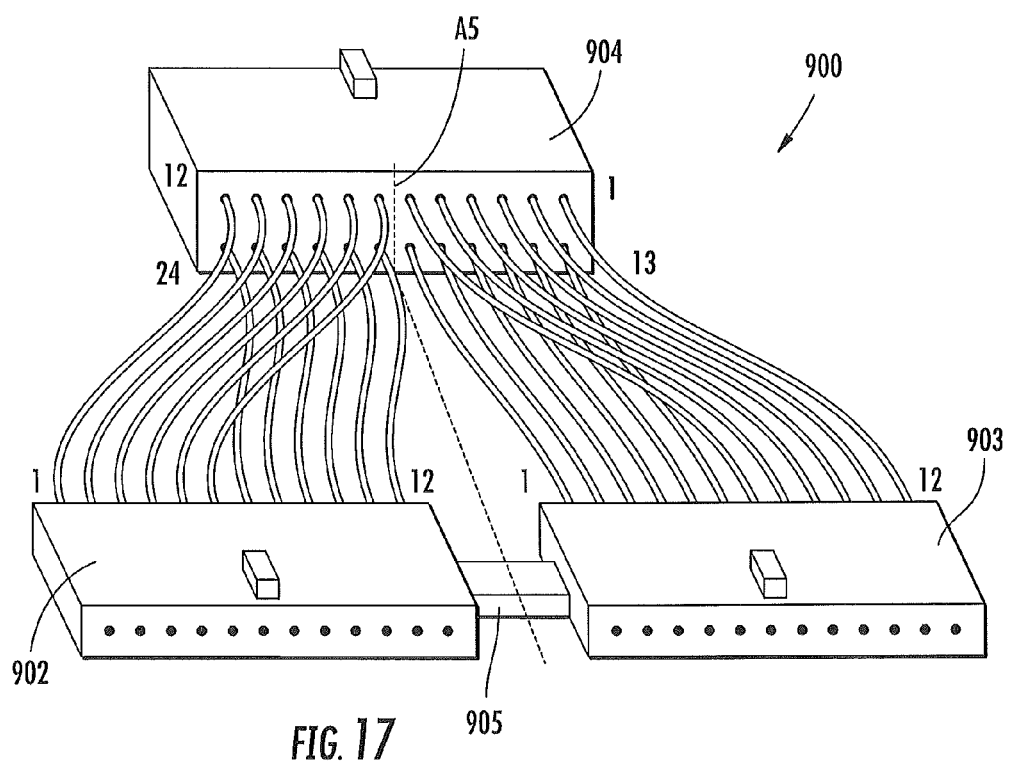
FIG. 17 is a schematic perspective view of a transition device according to embodiments of the present invention that has two rows of fibers divided by a vertical axis of symmetry.

Turning now to FIG. 17, an additional embodiment of a 24 fiber transition device, designated broadly at 900, is shown therein. However, the device 900 is configured to connect with a 24-fiber transceiver and to a couplet of 12-fiber trunk cables, the transceiver having transmit and receive ports arranged about a vertical axis of symmetry A5. The transition device 900 includes two trunk end terminals 902, 903 that receive 12 fibers each in a single row, and further includes a transceiver end terminal 904 that can connect with a 24-fiber transceiver. The 24 fibers that exit the transceiver end terminal 904 are routed to the trunk end terminals 902, 903 as mirror images of each other about the vertical axis of symmetry A5. More specifically, fibers 1-6 of the top row of transceiver end terminal 904 are routed to positions 7-12 of the trunk end terminal 903, whereas fibers 7-12 of the transceiver end terminal 904 are routed to mirror image positions 1-6 of trunk end terminal 902, and fibers 13-18 of the lower row of transceiver end terminal 904 are routed to positions 1-6 of trunk end terminal 903, whereas fibers 19-24 are routed to mirror image positions 7-12 of trunk end terminal 902. The transceiver end terminals 902, 903 are connected by a flexible strap 905 that facilitates insertion into a patch panel or the like.

It has been discovered that polarity between two transceivers can be maintained if the transition devices are configured such that the order of optical fibers within the trunk end terminals and the order of the trunk end terminals with respect to each other within both transition devices are arranged to produce the identical mirror image pattern of symmetry, the symmetry being achieved when transmitters and corresponding receivers are located in their respective mirror image positions about the centerline of a generally horizontally arranged array of the trunk end terminations. In some instances, this can be achieved through the use of transition devices with trunk end terminals that meet either of the following conditions: (c) the trunk end terminal receives couplets of fibers that originate from mirror image ports in the transceiver end terminal, or (d) the trunk end terminal has a corresponding trunk end terminal with the same number of ports, wherein the corresponding trunk end terminals receive fibers that originate from mirror image ports in the transceiver end terminal (as is the case with the trunk end terminals 902, 903 above). In the case of the transition device 900, the trunk end terminals 902, 903 meet condition (d) above.

FIG. 18 illustrates a telecommunications system 950 that employs two identical transition devices 900, 900' of the configuration illustrated in FIG. 17. The system 950 connects the two transition devices 900, 900' with two 12-fiber trunk cables 920, 920' via 12-fiber array connectors (adapters are not shown—they are typically MPO-type). Each of the transition devices 900, 900' is connected to a respective 24-fiber transceiver 910, 912. As can be seen in FIG. 18, all of the interconnections of the system 950 are "key-up to key-up" as described above.

The connectivity of the system can be traced by following a signal between the transceivers 910, 912. For example, following the transmit and receive arrangement for the transceivers shown in FIG. 18A, a signal exiting transmitter T1 (located in the top row on the far right position) travels into the transceiver end terminal 904 and into the rightmost fiber of the upper row (shown as position 1 of the transceiver terminal 904). The signal travels along this fiber into the rightmost position of the upper row of the trunk end terminal 903 (position 12). The signal then travels through the trunk end terminal 903 and into the rightmost position (position 1) of the terminal 922' of the trunk cable 920'. The signal travels through the rightmost fiber of the trunk cable 920' and exits through the rightmost position of the terminal 924' (labeled as position 12). The signal then enters the trunk end terminal 902' of the transition device 900' at the rightmost position (labeled position 1 in FIG. 18), travels in the rightmost fiber of the transition device 900', and enters the transceiver end terminal 904' in the rightmost position of the upper row (labeled position 12 in FIG. 18). The signal is then received at receiver R1 of the transceiver 912, which is located at the rightmost position of the upper row.

The return signal from the transceiver 912 can then be traced back to the transceiver 910. The signal exits the transmitter T1 (in FIG. 18, the leftmost position of the upper row of the transceiver 912), travels through the leftmost position of the upper row of the transceiver end terminal 904' (labeled as position 1 in FIG. 18), and further travels through the leftmost fiber of the transition device 900' to the leftmost position of the trunk end terminal 903' (labeled as position 12). The signal then travels to and through the terminal 924 of the trunk cable 920 and along the leftmost fiber thereof to the terminal 922, entering the leftmost position (labeled as position 12 in FIG. 18). The signal then passes to the leftmost position of the trunk end terminal 902 (labeled position 1) and through the leftmost fiber of the transition device 900 to the transceiver end terminal 904, where it enters the leftmost position of the upper row (labeled position 12 in FIG. 18). The signal then passes through the transceiver end terminal 904 and to the transceiver 910, where it is received in receiver R1. Thus, it can be seen that the signal is transmitted from the transmitters T1 and received in the receivers R1 of both transceivers 910, 912 to form a complete transmission channel. Similar tracings can be performed for the other channels of the system 950.

Notably, the system 950 provides proper connectivity for the channels of the transceivers 910, 912 with all of the interconnections of the components being "key-up to key-up" connections. Also, identical 12-fiber trunk cables 920, 920' can be employed, as can identical transition devices 900, 900'.

Figures 19, 19A:
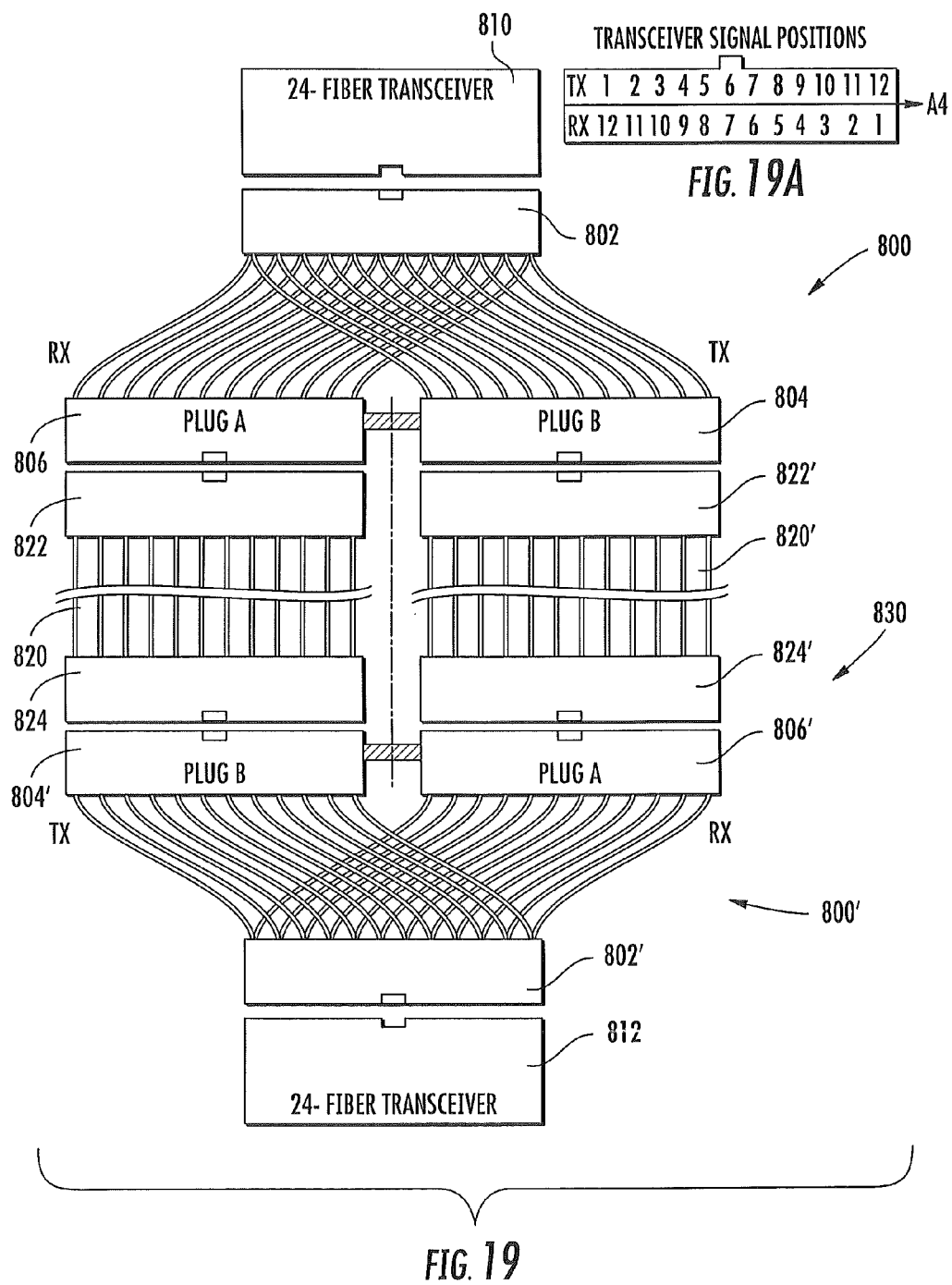
FIG. 19 is a schematic view of a telecommunications system that employs two transition devices of FIG. 16.
FIG. 19A is an end view of a transceiver of FIG. 19 showing the arrangement of ports.
Figures 22, 23:
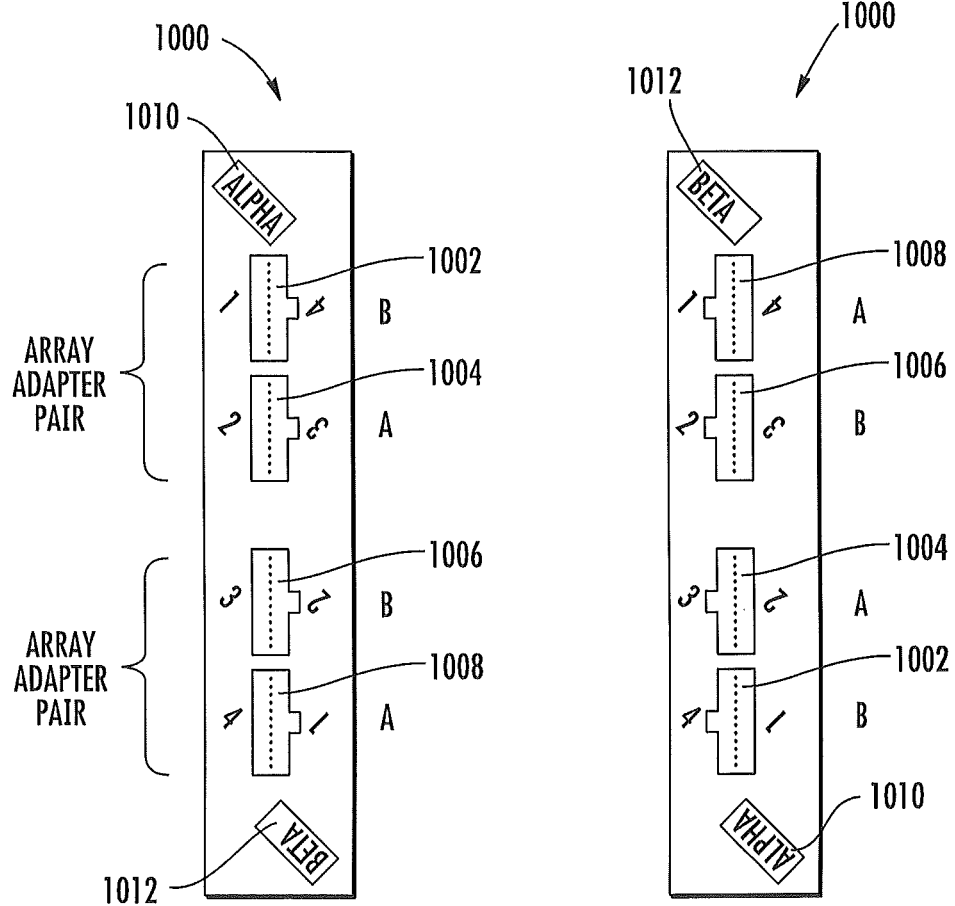

FIG. 19 illustrates that a similar telecommunications system 830 can be created with the transition device 800 illustrated in FIG. 16. (It should be noted that the transition device 800 can be used to interconnect either two 24-fiber transceivers, as shown here, with two 12-fiber trunk cables, or four 12-fiber transceivers with a 24-fiber trunk cable. This device meets condition (d) with respect to the illustrated 24-fiber transceivers of FIG. 19A and condition (b) with respect to certain 12-fiber transceivers). As seen in FIG. 19, the system 830 includes identical transition devices 800, 800' that connect to respective 24-fiber transceivers 810, 812 via transceiver end terminals 802, 802'. The transition device 800 connects to two 12-fiber trunk cables 820, 820' via trunk end terminals 804, 806, and the transition device 800' connects to the trunk cables 820, 820' via trunk end terminals 804', 806'. The transceivers 800, 800' have their transmit/receive channels arranged as shown in FIG. 19A, with the transmitters T1-T12 located in the upper row from left to right and the receivers R1-R12 located in the lower row from right to left. Other transceiver port arrangements are also compatible, such as one in which the transmitters and receivers are interchanged, one in which the orders of the transmitters and the receivers are both reversed, and one in which the transmitters and receivers are interleaved.

As with the systems described above, a signal can be traced to demonstrate the connectivity of the system 830. A signal transmitted from transmitter T1 exits the transceiver 810 from the leftmost position of the upper row, passes through the leftmost position of the upper row of transceiver end terminal 802, and travels along the leftmost fiber routed to the trunk end terminal 804. From there the signal travels through the terminal 822' of the trunk cable 820', along the leftmost fiber thereof, and into the leftmost position of the terminal 824'. The signal then enters the leftmost position of the trunk end terminal 806', travels along the leftmost fiber routed to the transceiver end terminal 802' (where it enters in the leftmost position of the lower row), and enters the transceiver 812 at the leftmost position in the lower row, which corresponds to receiver R1. The return path for this channel begins with transmitter T1 of the transceiver 812, which is located at the rightmost position of the upper row. The signal enters the rightmost position of the terminal 802', travels along the rightmost fiber routed to the trunk end terminal 804 to enter the rightmost position thereof, passes through the terminal 824 of the trunk cable 820, travels along the rightmost fiber of the trunk cable 820 to the rightmost position of the terminal 822, passes into the rightmost position of the trunk end terminal 806, and travels along the rightmost fiber exiting the trunk end terminal 806 to the rightmost position of the lower row of the transceiver end terminal 802, which positions the signal to reach the receiver R1 of the transceiver 810. The remaining channels between the transceivers 810, 812 can similarly be traced. Thus, it can be seen that the use of two identical transition devices 800, 800' and trunk cables 820, 820' can connect two 24-fiber transceivers in a key-up to key-up relationship and maintain proper connectivity.

FIGS. 20-23 show a patch panel 1000 that can be used to connect transition devices such as those shown in FIGS. 16 and 18 to trunk cables. The patch panel 1000 includes four adapter apertures 1002, 1004, 1006, 1008, which are arranged in "A" and "B" pairs, with their alignment keyways oriented in the same direction. The adapter apertures 1002, 1004, 1006, 1008 are sized to receive trunk cables such as trunk cables 200 and 920 discussed above. A transition device, such as the transition device 900, would supply trunk end terminals 902, 903 to the patch panel 1000 for interconnection with the trunk cables. The panel 1000 also includes orientation indicia 1010 on one corner thereof and orientation indicia 1012 in the opposite corner thereof. As described in detail in U.S. Pat. No. 7,416,347 to Livingston et al., the disclosure of which is hereby incorporated herein, the orientation indicia are themselves oriented such that an "alpha" configuration is indicated when the orientation indicia 1010 is easily read (as in the horizontal orientation of FIG. 20 or the vertical orientation of FIG. 22), and a "beta" orientation is indicated when the orientation indicia 1012 is easily read (as in the horizontal orientation of FIG. 21 or the vertical orientation of FIG. 23). Notably, when the orientation is inverted (e.g., the alpha orientation of FIG. 20 versus the beta orientation of FIG. 21), the positions of the "A" and "B" pairs are reversed: in the alpha configuration, the B apertures 1002, 1006 are positioned on the left side of each pair, whereas in the beta configuration, the A apertures 1004, 1008 are on the left side of each pair).

Figure 24:
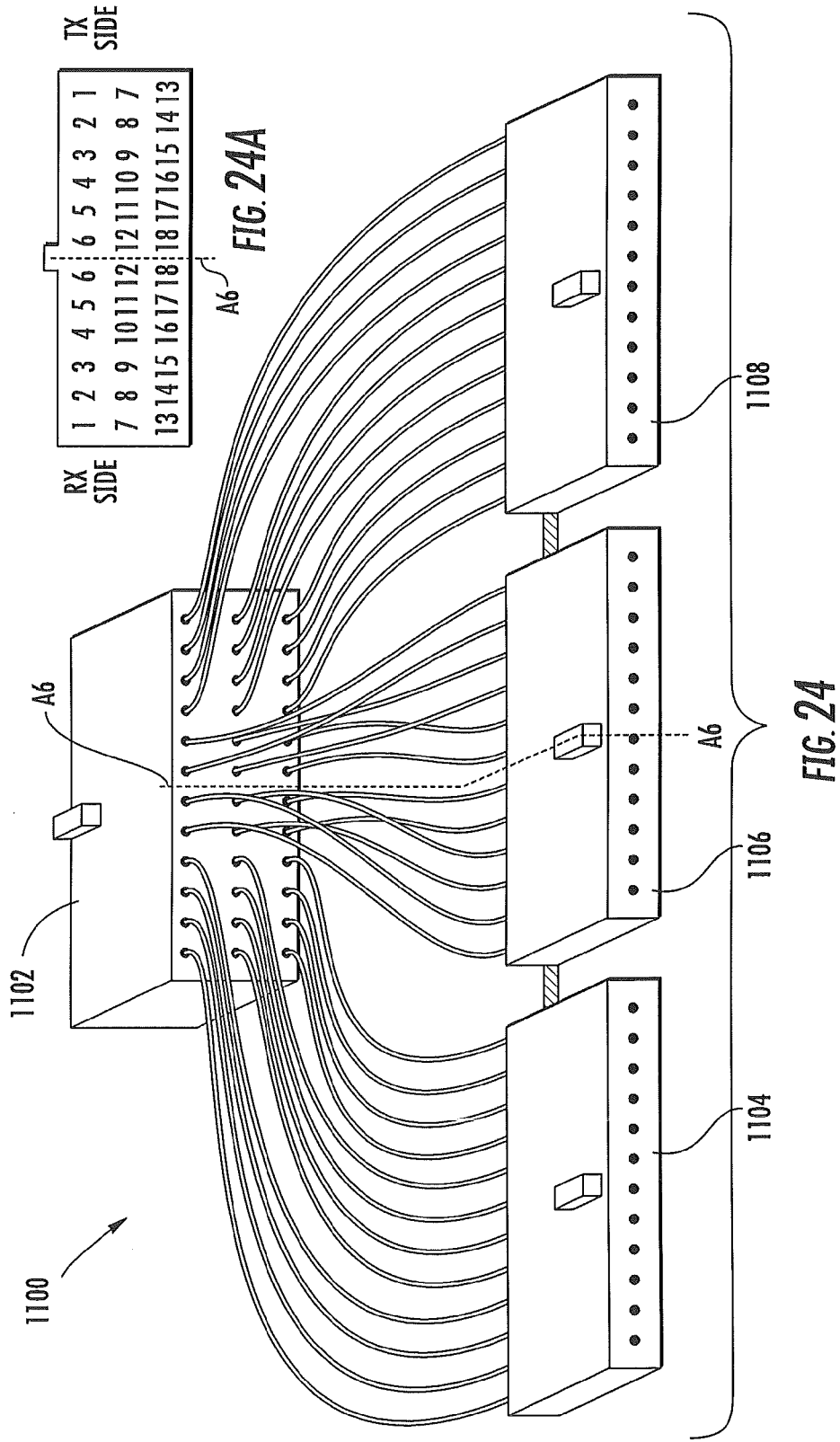
FIG. 24 is a schematic perspective view of a transition device according to embodiments of the present invention that has three rows of fibers divided by a vertical axis of symmetry.

To illustrate that these concepts may also pertain to transceivers with odd numbers of row of ports, FIG. 24 shows a 36-fiber transition device 1100 with three rows of twelve fibers each at the transceiver end terminal 1102. The transition device 1100 includes the transceiver end terminal 1102 and three trunk end terminals 1104, 1106, 1108. As shown in FIG. 24A, the transceiver end terminal 1102 has port positions that are numbered 1-6, 7-12 and 13-18 on each side of a vertical axis of symmetry A6. Fibers extend from ports 1-4, 7-10 and 13-16 on the left side of the axis A6 to the trunk end terminal 1104, where they feed a single row of ports 1-12. Similarly, the fibers in ports 1-4, 7-10 and 13-16 on the right side of axis A6 feed a single row of ports in trunk end terminal 1108. As such, the trunk end terminals 1104, 1108 meet condition (d). Trunk end terminal 1106 receives fibers from ports 5, 6, 11, 12, 17 and 18 from each side of the axis A6 as a single row, wherein each fiber is routed to a port that is the mirror image of the port to which its mirror image fiber is routed. As such, trunk end terminal 1106 meets condition (c). It can also be seen that the fibers in the trunk end terminals 1104, 1106, 1108 are positioned to produce mirror image order about a central plane that extends through the center of the arrangement of the trunk end terminals and includes the axis A5. As such, two identical transition devices 1100 may be employed in a system with two 36-fiber transceivers and provide proper polarity.

Figure 25:
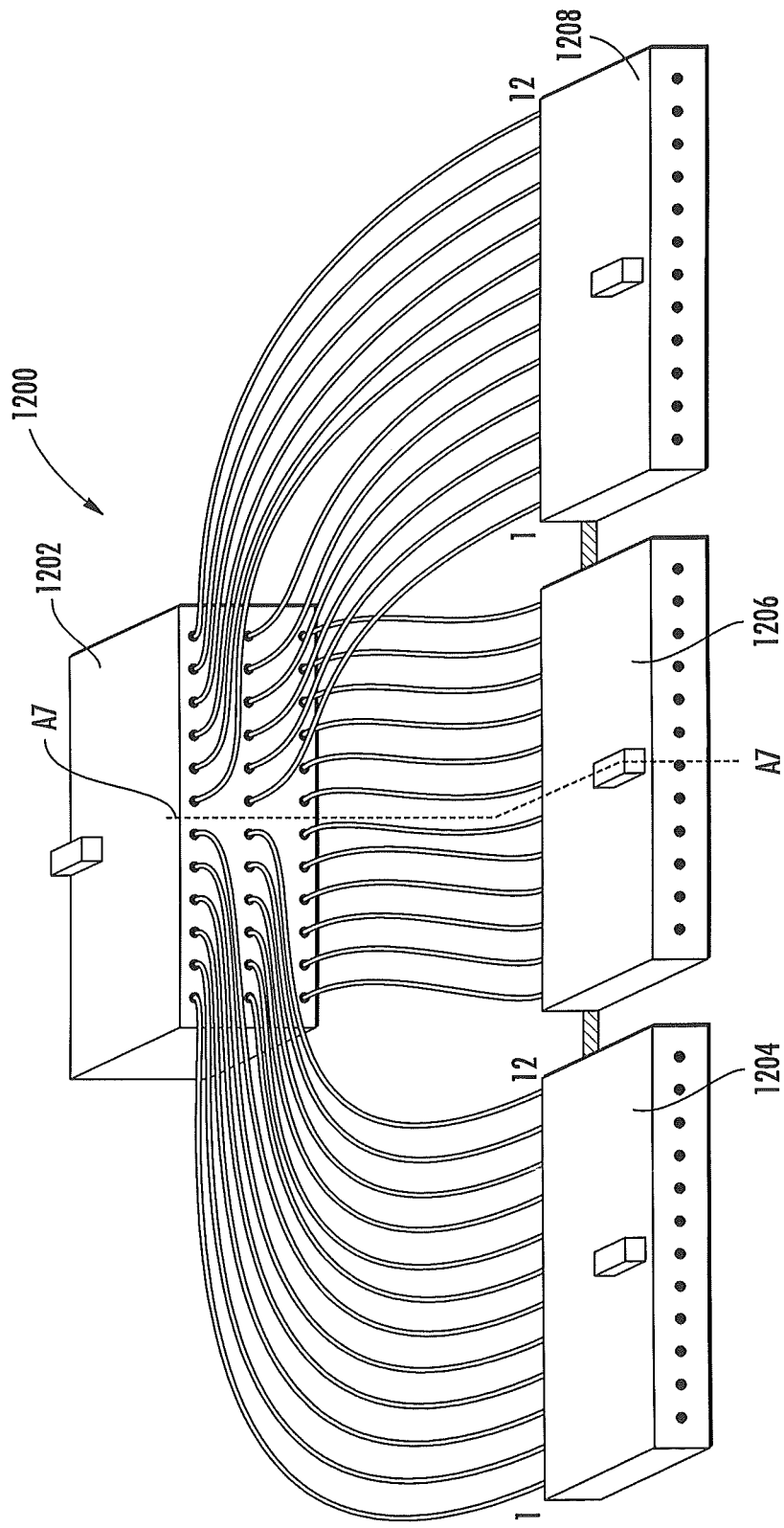
FIG. 25 a schematic perspective view of a transition device according to other embodiments of the present invention that has three rows of fibers divided by a vertical axis of symmetry.

Another 36-fiber transition device 1200 is illustrated in FIG. 25. The transition device 1200 includes a transceiver end terminal 1202 with 36 ports arranged in the same three rows and the same numbering scheme as described above for the transition device 1100. The fibers are routed from ports 1-12 of the transceiver end terminal 1202 to similarly numbered ports in the trunk end terminals 1204, and to the reverse ordered ports in the trunk end terminal 1208. Fibers are routed from ports 13-18 on each side of the axis A7 into a single row in trunk end terminal 1206. As with the transition device 1100, the trunk end terminals 1204, 1208 meet condition (d), and the trunk end terminal 1206 meets condition (c). As such, the arrangement of fibers and trunk end terminals in the transition device 1200 produces a mirror image about a plane that extends through the axis A7.

Figure 26:
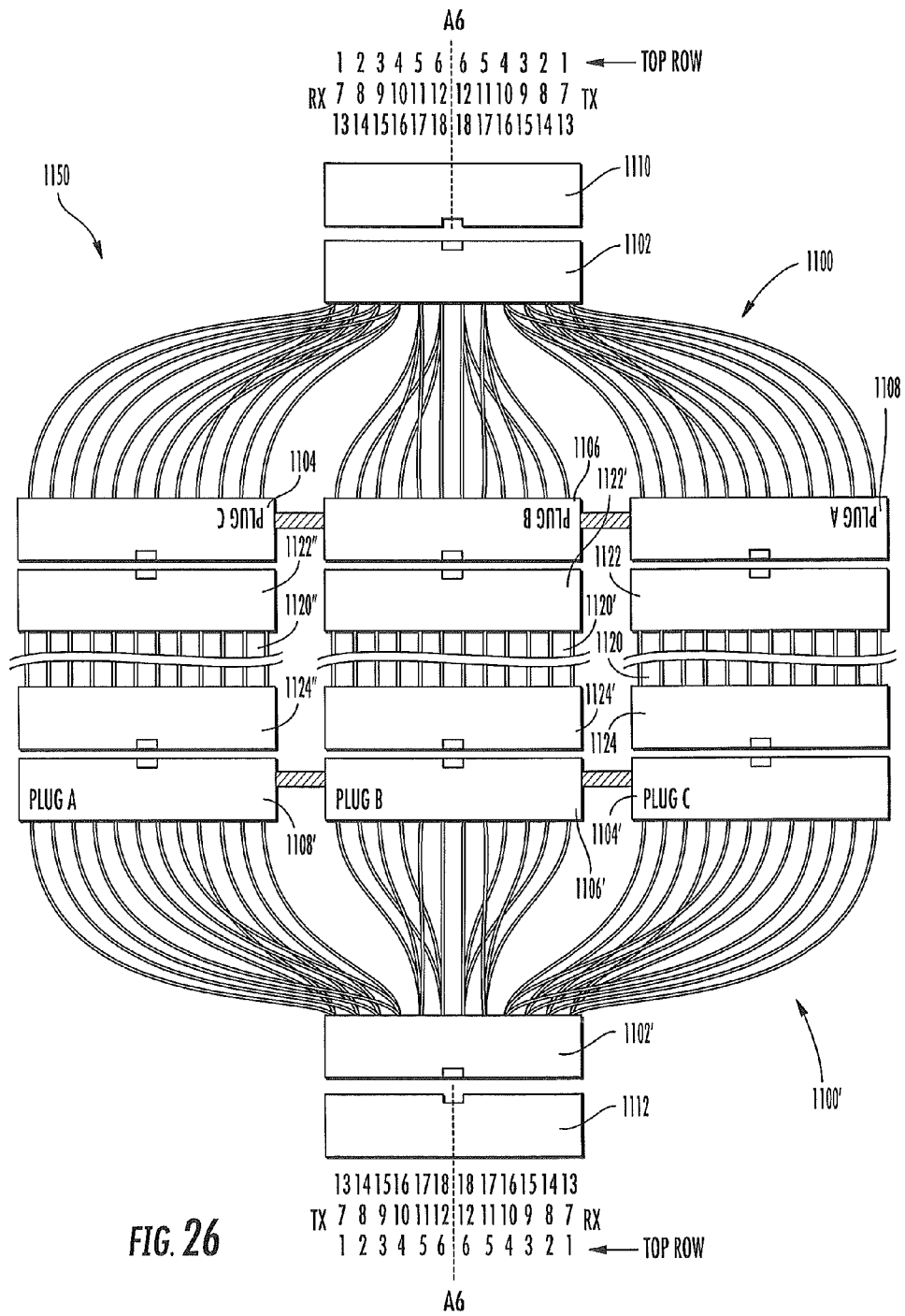
FIG. 26 is a schematic view of a telecommunications system that employs two transition devices of FIG. 24.

Turning now to FIG. 26, a telecommunications system 1150 that utilizes two identical transition devices 1100, 1100' is illustrated. The system 1150 includes two 36-fiber transceivers 1110, 1112 that are connected with the transition devices and three identical 12-fiber trunk cables 1120, 1120', 1120". As can be seen in FIG. 26, the trunk end terminal 1104 of transition device 1100 is connected to the trunk end terminal 1108 of the transition device 1100' via the trunk cable 1120", the trunk end terminal 1106 is connected to the trunk end terminal 1106 via trunk cable 1120', and the trunk end terminal 1108 is connected to the trunk end terminal 1104' via the trunk cable 1120.

To demonstrate the connectivity of the system 1150, a signal starting at position 1 on the right side of the upper row of the transceiver 1110 (i.e., from transmitter T1) passes through the transceiver end terminal 1102 and into the rightmost fiber of the transition device 1100. From there, the signal passes through the rightmost port of the trunk end terminal 1108 and into the rightmost fiber of the trunk cable 1120. The signals then travels through the rightmost port of the trunk end terminal 1104' and into the rightmost fiber of the transition device 1100'. The signal is then routed through the rightmost port of the upper row of the transceiver end terminal 1102' and into the transceiver 1112, where it is received by receiver R1 at position 1. The return path begins at transmitter T1, from where the signal passes (a) through the leftmost position of the upper row of the transceiver end terminal 1102', (b) along the leftmost fiber of the transition device 1100', (c) through the leftmost port of the trunk end terminal 1108', (d) along the leftmost fiber of the trunk cable 1120", (e)

into and through the leftmost port of the trunk end terminal 1104, (f) along the leftmost fiber of the transition device 1100 exiting the trunk end terminal 1104, and (g) into and through the leftmost port of the upper row of the transceiver end terminal 1102, where it is received at the receiver R1. Similar tracings can be performed for the other channels of the system to demonstrate proper connectivity. Thus, it can be seen that the system 1150 maintains proper polarity between the transceivers 1110, 1112 with two identical transition devices 1100, 1100' and three identical trunk cables 1120, 1120', 1120".

Turning now to FIGS. 27 and 28, it can be seen that systems of the present invention, and in particular the system 1150 illustrated in FIG. 27, can be inverted to facilitate operations. For maintenance, testing and administration purposes, it may be advantageous to route signals so that the signals entering panel position 1 at one end of a trunk cable exit position 1 at the other end. To accomplish this, adapters (designated at 1130 and 1130' in FIGS. 27 and 28) can be rotated as a ganged group from keyways-up on one cable end (i.e., where terminals 1122, 122', 1122" connect with adapter 1130) to keyways-down on the opposite cable end (i.e., where terminals 1124, 1124', 1124" connect with adapter 1130'). Inverting the keyways so that they face downwardly on one end allows spatial position of signals to be the same on panels at both ends of the cable. To achieve this arrangement and maintain connectivity, the trunk cables 1120, 1120', 1120" are shown with a twist that is imparted by this adapter rotation. Similarly, because the trunk end terminals 1104', 1106', 1108' are oriented with their keyways facing downwardly to attach to the adapter 1130, the fibers of the transition device 1100' are shown with a twist so that the transceiver end terminal 1102' is still oriented in a "key-up" orientation to connect with transceiver 1112. Those skilled in this art will recognize that similar arrangements with others of the systems illustrated and discussed herein may also be employed.

Those skilled in this art will appreciate that other transition devices may also be employed in the systems of the present invention. As one example, the device 100 may be modified such that one transceiver end terminal would receive fibers 1, 2, 11 and 12, another would receive fibers 3, 4, 9 and 10, and a third would receive fibers 5-8, as each of these transceiver end terminals would meet condition (b). As another example, multi-row transceivers with even numbers of rows may employ a modified version of the arrangement of FIG. 16, with transmitter and receiver rows alternating, or with all of the transmitters in the top half of the row and all of the receivers in the bottom half of the row.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A transition device for an optical fiber connection system, the transition device adapted to interconnect a trunk cable with a plurality of transceivers, the transition device comprising:
    a first set of at least four optical fibers, each of the optical fibers having a trunk end and a transceiver end;
    a single trunk end terminal having a plurality of trunk ports, each port connected with a respective one of the set of optical fibers at its trunk end, wherein a first axis of symmetry divides the ports; and
    a plurality of transceiver end terminals, each of the transceiver end terminals having even numbers of transceiver ports, each of the transceiver ports receiving a respective one of the set of optical fibers at their transceiver ends;
    wherein the fibers received by each transceiver end terminal meet either of the following two conditions:
    (a) a first fiber originates from a first port in the trunk end terminal, and a second fiber originates from a second port in the trunk end terminal that is positioned at the mirror image location of the first port about the first axis of symmetry; or
    (b) each fiber is received in a first transceiver end terminal that has a corresponding second transceiver end terminal with the same number and arrangement of transceiver ports, and each fiber received in the first transceiver end terminal originates from a port in the trunk end terminal that has a mirror image port about the first axis of symmetry from which a fiber that is received in the second transceiver end terminal originates;
    wherein at least one of the transceiver end terminals has a different number of ports than at least one of the other transceiver end terminals.

2. The transition device defined in claim 1, wherein the trunk end terminal has an alignment key.

3. The transition device defined in claim 1, wherein at least one of the transceiver end terminals satisfies condition (a), and at least one of the transceiver end terminals satisfies condition (b).

4. The transition device defined in claim 1, wherein the first set of optical fibers comprises 12 optical fibers.

5. The transition device defined in claim 1, wherein the plurality of transceiver end terminals is two, three, four or five transceiver end terminals.

6. The transition device defined in claim 1, wherein the first axis of symmetry is generally perpendicular to the row of trunk end terminals.

7. The transition device defined in claim 1, further comprising a housing such that the device is a transition cassette.

8. The transition device defined in claim 1, wherein the device is configured as a fan-out unit.

9. A transition device for an optical fiber connection system, the transition device adapted to interconnect a trunk cable with a plurality of transceivers, the transition device comprising:
    a first set of at least four optical fibers, each of the optical fibers having a trunk end and a transceiver end;
    a single trunk end terminal having a plurality of trunk ports, each port connected with a respective one of the set of optical fibers at its trunk end, wherein a first axis of symmetry divides the ports; and
    a plurality of transceiver end terminals, each of the transceiver end terminals having even numbers of transceiver ports, each of the transceiver ports receiving a respective one of the set of optical fibers at their transceiver ends;
    wherein the fibers received by each transceiver end terminal meet either of the following two conditions:
    (a) a first fiber originates from a first port in the trunk end terminal, and a second fiber originates from a second port in the trunk end terminal that is positioned at the mirror image location of the first port about the first axis of symmetry; or
    (b) each fiber is received in a first transceiver end terminal that has a corresponding second transceiver end terminal with the same number and arrangement of transceiver ports, and each fiber received in the first transceiver end terminal originates from a port in the trunk end terminal that has a mirror image port about the first axis of symmetry from which a fiber that is received in the second transceiver end terminal originates;

wherein at least one of the transceiver end terminals satisfies condition (a), and at least one of the transceiver end terminals satisfies condition (b).

10. The transition device defined in claim 9, wherein the trunk end terminal has an alignment key.

11. The transition device defined in claim 9, wherein the plurality of transceiver end terminals comprises an odd number of transceiver end terminals, and wherein each of the transceiver end terminals includes the same number of transceiver ports as each of the other transceiver end terminals.

12. The transition device defined in claim 11, wherein the first set of optical fibers comprises 12 optical fibers.

13. The transition device defined in claim 12, wherein the plurality of transceiver end terminals is three transceiver end terminals.

14. The transition device defined in claim 9, wherein the first axis of symmetry is generally perpendicular to the row of trunk end terminals.

15. The transition device defined in claim 9, further comprising a housing such that the device is a transition cassette.

16. The transition device defined in claim 9, wherein the device is configured as a fan-out unit.

17. A transition device for an optical fiber connection system, the transition device adapted to interconnect a trunk cable with a plurality of transceivers, the transition device comprising:

a first set of at least four optical fibers, each of the optical fibers having a trunk end and a transceiver end;

a single trunk end terminal having a plurality of trunk ports, all of the trunk ports of the plurality of trunk ports being arranged in a single row, each port connected with a respective one of the set of optical fibers at its trunk end, wherein a first axis of symmetry divides the ports; and a plurality of transceiver end terminals, each of the transceiver end terminals having even numbers of transceiver ports, each of the transceiver ports receiving a respective one of the set of optical fibers at their transceiver ends;

wherein the fibers received by each transceiver end terminal meet either of the following two conditions:

(a) a first fiber originates from a first port in the trunk end terminal, and a second fiber originates from a second port in the trunk end terminal that is positioned at the mirror image location of the first port about the first axis of symmetry; or (b) each fiber is received in a first transceiver end terminal that has a corresponding second transceiver end terminal with the same number and arrangement of transceiver ports, and each fiber received in the first transceiver end terminal originates from a port in the trunk end terminal that has a mirror image port about the first axis of symmetry from which a fiber that is received in the second transceiver end terminal originates.

18. The transition device defined in claim 17, wherein the trunk end terminal has an alignment key.

19. The transition device defined in claim 17, wherein at least one of the transceiver end terminals satisfies condition (a), and at least one of the transceiver end terminals satisfies condition (b).

20. The transition device defined in claim 17, wherein the first set of optical fibers comprises 12 optical fibers.

* * * * *